United States Patent
Mishima et al.

(10) Patent No.: US 7,375,762 B2
(45) Date of Patent: May 20, 2008

(54) FRAME INTERPOLATION METHOD AND APPARATUS, AND IMAGE DISPLAY SYSTEM

(75) Inventors: Nao Mishima, Kawasaki (JP); Go Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 936 days.

(21) Appl. No.: 10/855,617

(22) Filed: May 28, 2004

(65) Prior Publication Data
US 2005/0053291 A1    Mar. 10, 2005

(30) Foreign Application Priority Data
May 30, 2003  (JP) .............................. 2003-155463

(51) Int. Cl.
*H04N 7/01* (2006.01)
*H04N 5/21* (2006.01)
(52) U.S. Cl. ....................... 348/441; 348/452; 348/620; 348/699
(58) Field of Classification Search ................ 348/441, 348/451, 452, 620, 621, 699; 382/236, 276; 375/240.16, 240.24; H04N 7/01, 11/20, H04N 5/21, 5/14, 9/64
See application file for complete search history.

(56) References Cited

U.S. PATENT DOCUMENTS 5,990,962 A * 11/1999 Ueno et al. .................. 348/699

2005/0100095 A1* 5/2005 Itoh et al. .............. 375/240.16

FOREIGN PATENT DOCUMENTS

| JP | 8-46925 | 2/1996 |
|----|---------|--------|
| JP | 2528103 | 8/1996 |
| JP | 2000-224593 | 8/2000 |

* cited by examiner

*Primary Examiner*—Sherrie Hsia
(74) *Attorney, Agent, or Firm*—Oblon, Spivak, McClelland, Maier & Neustadt, P.C.

(57) ABSTRACT

An image interpolation method comprises searching a motion vector from different pairs of blocks on a first and a second reference image symmetrically, extracting a first and a second image block from the first and the second reference image, respectively, the first and the second image block being located by the motion vector, determining a region determination threshold using an absolute difference between paired opposite pixels of the first and the second image block, extracting from each of the first and the second image block a first pixel region that the absolute difference is smaller than the region determination threshold, and obtaining a pixel value of a second pixel region of the to-be-interpolated block from a pixel value of the first pixel region of each of the first and the second image block, the second pixel region corresponding to the first pixel region.

22 Claims, 16 Drawing Sheets

FRAME INTERPOLATION METHOD AND APPARATUS, AND IMAGE DISPLAY SYSTEM

CROSS-REFERENCE TO RELATED APPLICATIONS

This application is based upon and claims the benefit of priority from prior Japanese Patent Application No. 2003-155463, filed May 30, 2003, the entire contents of which are incorporated herein by reference.

BACKGROUND OF THE INVENTION

1. Field of the Invention

The present invention relates to a frame interpolation method and apparatus of interposing at least one interpolation frame between adjacent frames for the purpose of decreasing a display frame interval in playing back a video image, and an image display system using the same.

2. Description of the Related Art

In a hold model picture display apparatus which continues to display a previous frame till an image is newly written in, such as a liquid crystal display and an electroluminescence display, there are problems such as a blurring occurring when eyes of a viewer follow movement of a moving object in a video display, and an unnatural movement due to displaying a video with a few frames.

A display frame interval may be decreased for the problems to be solved. A concrete method of decreasing a display frame interval is to generate an interpolation frame using motion compensation used by MPEG (Motion Picture Experts Group) and to interpose it between adjacent frames. In the motion compensation in MPEG, a motion vector detected by an image block matching method is used. The image block matching method includes dividing a first reference frame into a plurality of first image block, searching a second reference frame approximate to the first reference frame for a second image block having a maximum correlation with respect to each first image block, and deriving a motion vector from the second image block to the first image block.

In the image block based frame interpolation method using such motion compensation, when an interpolation frame is generated by the motion compensation, at first a scaling process which converts a first motion vector between the first and the second reference frames to a second motion vector between the interpolation frame and the first reference frame is carried out. Carrying out the motion compensation using the second motion vector provided by the scaling process generates the interpolation frame. In other words, the end point of the second motion vector is fixed on the first reference frame, and the image data of the image block indicated by the end point of the second motion vector is copied to the position of the to-be-interpolated block indicated by the starting point of the second motion vector on the interpolation frame.

In this method, the starting point of the second motion vector provided by the scaling does not always coincide with the position of the original to-be-interpolated block on the interpolation frame. For this reason, a gap having no image data or a region on which image data are overlapped may occur on the interpolation frame.

Japanese patent publication No. 2528103 (patent document 1) discloses a frame interpolation method without such a gap or overlapping. This method interpolates a frame by deriving correlation between reference frames located before and after with respect to a to-be-interpolated block on the interpolation frame. As a result, it is possible to generate an interpolation frame directly by using the motion vector derived at first without scaling of a motion vector. Further, the to-be-interpolated blocks are arranged on the interpolation frame in a form of a uniform lattice, so that the gap or overlapping does not occur on the interpolation frame.

The method of the patent document 1 is an image block based method to process an image in units of an image block similarly to MPEG. For this reason, there is a problem that a block distortion occurs on a boundary between the image blocks on the interpolation frame in the case that there are a plurality of movements in the image block.

When an object moves from left to right on a stationary background, interpolation is performed on the background around the object. In this time, completely different backgrounds are averaged, resulting in producing a different background around the object. Therefore, a gap occurs between the background around the object and the original background on the outside thereof. The gap is visually recognized as block distortion.

An object of the invention is to provide a frame interpolation method and apparatus wherein no block-to-block gap and no block overlapping occur on an interpolation frame and block distortion is suppressed, and an image display system using the same.

BRIEF SUMMARY OF THE INVENTION

An aspect of the invention provides an image interpolation method of interposing an interpolation image between a first reference image and a second reference image adjacent to the first reference image in terms of time, the method comprising: searching a motion vector from different pairs of blocks on the first reference image and the second reference image symmetrically; extracting a first image block and a second image block from the first reference image and the second reference image, respectively, the first image block and the second image block being located by the motion vector; determining a region determination threshold using an absolute difference between paired opposite pixels of the first image block and the second image block; extracting from each of the first image block and the second image block a first pixel region that the absolute difference is smaller than the region determination threshold; and obtaining a pixel value of a second pixel region of the to-be-interpolated block from a pixel value of the first pixel region of each of the first image block and the second image block, the second pixel region corresponding to the first pixel region.

DETAILED DESCRIPTION OF THE INVENTION

Figure 1:
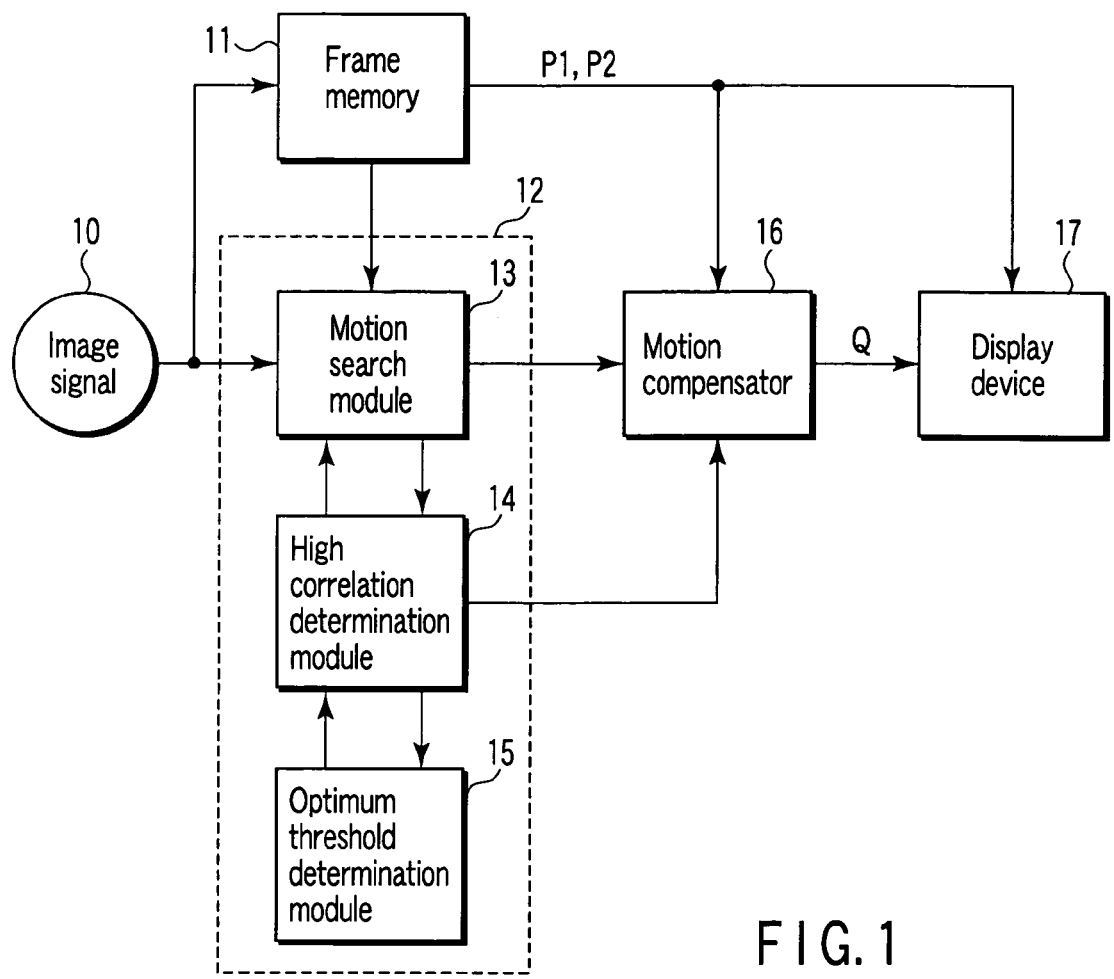
FIG. 1 is a block diagram of an image display system according to a first embodiment of the present invention.

There will now be described the embodiment of the present invention referring to the drawing.

First Embodiment 1

FIG. 1 shows a configuration of a video display system related to the first embodiment of the present invention.

There is described an example to convert an input picture signal (video signal) 10 which is a non-interlace signal of 60 Hz (progressive signal) into a non-interlace signal of 120 Hz.

Figure 2:
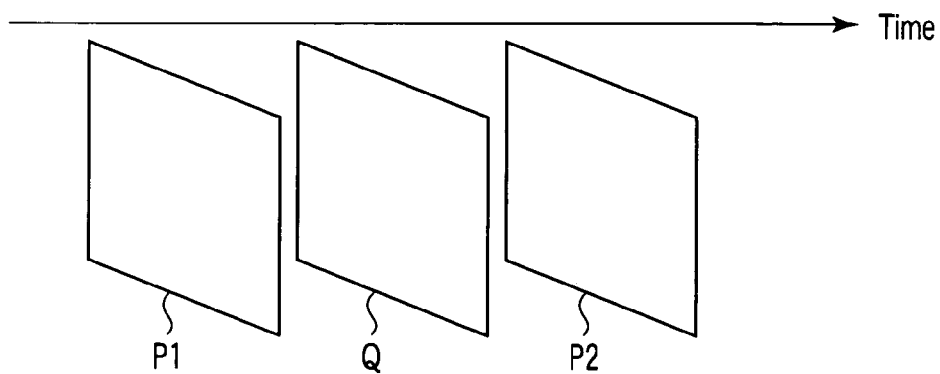
FIG. 2 is a diagram of explaining a concept of a frame interpolation in the first embodiment.

Frame interpolation in the present embodiment is realized by interpolating an interpolation frame Q (at a middle position in terms of time between reference frames P1 and P2 (images)) between the two reference frames P1 and P2 adjacent in terms of time with respect to the non-interlace input signal of 60 Hz as shown in FIG. 2.

In FIG. 1, the video signal 10 is input to a frame memory 11 and a motion estimation unit 12. The motion estimation unit 12 comprises a movement motion search module 13, a high correlation region determination division module 14 and an optimum threshold determination module 15. The movement search module 13 searches for a motion vector between the reference frames P1 and P2. The searched motion vector is input to a motion compensation module 15. Motion compensation is done using the motion vector in the motion compensation module 15 to generate an interpolation frame (image) Q.

It is determined in the high correlation region determination module 14 whether the pixel values of the opposite pixels between the image block of the reference frame P1 and the image block of the reference frame P2 substantially coincide with each other. The image block is a small rectangular region of a uniform size including a plurality of pixels, for example, 8*8 pixels. A pair of opposite pixels are a pair of pixels that are equal in position to each other between two image blocks. The determination result of the high correlation region determination module 14 is input to the movement search module 13 and the optimum threshold determination module 15.

The optimum threshold determination module 15 determines an optimum threshold for dividing each image block of each of the reference pictures P1 and P2 into the high correlation region (the first region) and the low correlation region (the second region). The correlation determination module 14 determines a high correlation region or a low correlation region for each image block according to a region determination value and divides the image block into the high correlation region and low correlation region according to this determination result. The processes of the movement search module 13, the high correlation determination module 14 and the optimum threshold determination module 15 are described in detail hereinafter.

Figure 3:
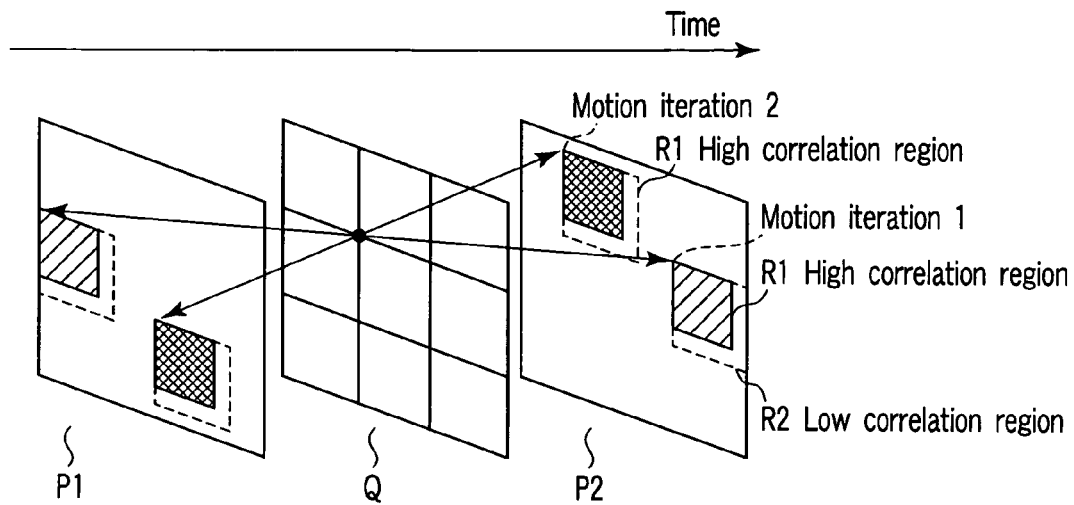
FIG. 3 is a diagram of explaining a technique of avoiding block distortion in the first embodiment.

A method shown in FIG. 3 is thought in order to prevent the block distortion apt to occur in a conventional block based frame interpolation method as previously described. The reference frames P1 and P2 are divided into the image blocks B1 and B2 respectively. Further, the image blocks B1 and B2 are divided into the high correlation region R1 and the low correlation region R2. A motion vector is assigned to the pixels of the high correlation regions R1 of the image blocks B1 and B2. The low correlation region R2 is recursively subjected to a motion vector searching to make it possible to assign another motion vector to the pixels of the low correlation region R2.

The high correlation region R1 is a region of pixels whose pixel values can be considered to coincide substantially between the image blocks B1 and B2. More specifically, it is a high correlation region that an absolute difference between a pair of opposite pixels of the image blocks B1 and B2 is smaller than a region determination threshold T1. The low correlation region R2 is a region that pixel values of the image blocks B1 and B2 can be considered to be low correlation substantially therebetween. More specifically, it is a low correlation region that the absolute difference is not less than the region determination threshold T1. An interpolation pixel value is generated by using the pixel values of the high correlation regions R1 of the is image blocks B1 and B2, and copied to a to-be-interpolated block thereby to generate an interpolation frame.

Figure 4:
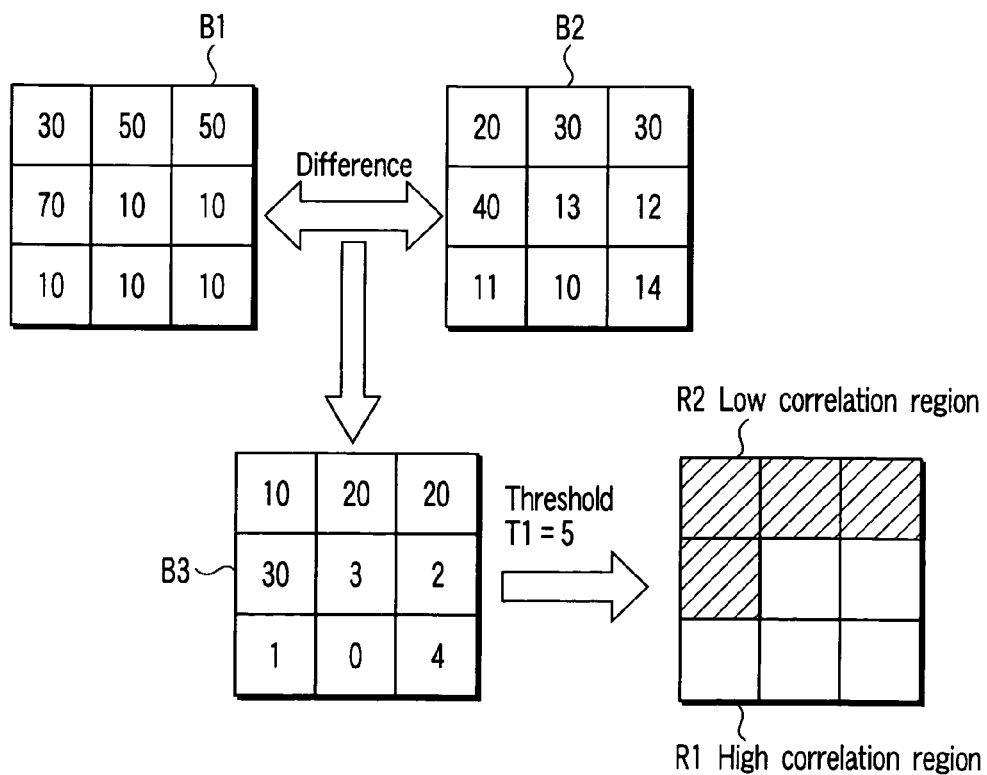
FIG. 4 is a diagram showing an example that a region partitioning between blocks of each of two reference frames is done justly.

It is possible to solve a problem of block distortion by such a method. However, this method cannot justly divide the image block B1 and B2 into the high correlation region R1 and low correlation region R2 due to how to set the region determination threshold T1, resulting inall process becoming insignificant. When the paired opposite pixels of the image blocks B1 and B2 are comparatively near in pixel value as shown in FIG. 4, and the region determination threshold T1 is set to "5" for the image block B3 configured with pixels of the absolute difference, the image blocks B1 and B2 can be justly divided into the high correlation region R1 and the low correlation region R2. The paired opposite pixels are a pair of opposite pixels of the image blocks B1 and B2 which coincide in position.

Figure 5:
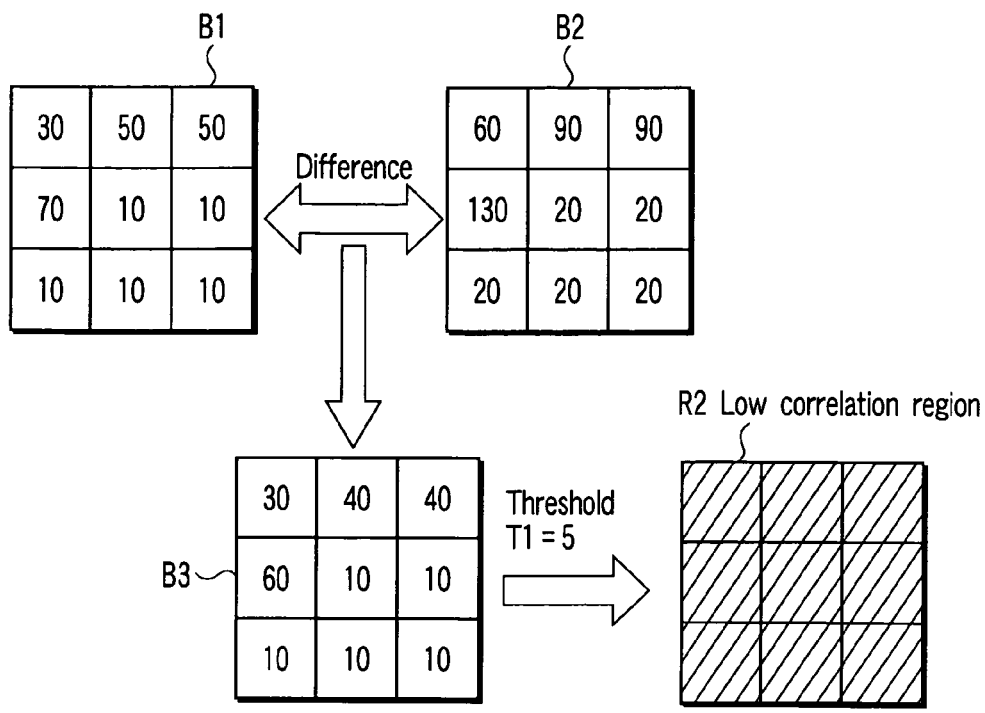
FIG. 5 is a diagram showing an example that a region partitioning between blocks of each of two reference frames fails to be done justly.

In contrast, assuming the pixel values of the opposite pixels of the image blocks B1 and B2 are comparatively different as shown in FIG. 5. In this case, if the threshold T1 is set to the same "5" with respect to the image block B3, a division state that all pixels in the block becomes the low correlation region R2 results in. This division state differs from that viewed by a user.

If the region determination threshold T1 is set to "11" for the image blocks B1, B2 and B3 as shown in FIG. 5, the image blocks B1 and B2 should be able to be divided justly into the high correlation region R1 and the low correlation region R2 in the same way as FIG. 4. The method of determining such an optimum region determination threshold is not known. The present embodiment provides a method of determining an optimum region determination threshold every image block in a dynamic by solving an optimization problem of the threshold due to distribution (referred to as luminance distribution) of pixel values (luminance) in an image block.

A frame interpolation procedure including a process of determining the optimum region determination threshold determination process based on the present embodiment is described in conjunction with FIG. 6 hereinafter. An interpolation frame (interpolation frame Q to be interpolated) is divided into small rectangular regions (referred as to to-be-interpolated blocks) B0 of a uniform size as shown in FIG. 7 (step S101). The to-be-interpolated blocks B0 divided in step S101 are sequentially scanned (step S102). A motion estimation process (step S103) and motion compensation process (step S104) are performed for each of the to-be-interpolated blocks B0 till all of the to-be-interpolated blocks B0 on the interpolation frame have been scanned in step S105.

Figure 8:
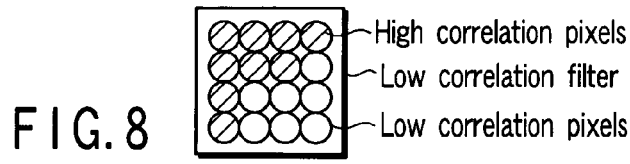
FIG. 8 is a diagram of describing a low correlation filter in the first embodiment.

Motion estimation is done in step S103 as described below, to derive a group of motion vectors and a group of low correlation filters (subroutine 1). The low correlation filter is a digital filter having "0" or "1" as a pixel value and the same shape and size as the to-be-interpolated block B0 as shown in FIG. 8. The high correlation pixel is indicated by "0", and the low correlation pixel by "1". In step S104, motion compensation for generating an interpolation frame is done based on the group of motion vectors and the group of low correlation filters that are derived by the subroutine 1 of step S103 and the reference frames P1 and P2.

<Motion Estimation Process>

There will be explained the motion estimation process of step S103 which is subroutine 1 shown in FIG. 3. In the motion estimation process, the motion vector are searched for a pair of image blocks B1 and B2 of maximum correlation in the search regions setting to the reference frames P1 and P2, to obtain a motion vector (movement search process).

The optimum region determination threshold T1 is computed from the image blocks B1 and B2 in the reference frames P1 and P2 that are located by the motion vector searched for by the movement search process (optimum threshold determination process).

The correlation of the blocks is determined every pixel from the absolute difference between the opposite pixels of the image blocks B1 and B2 according to the region determination threshold T1. The above-mentioned low correlation filter is generated (high correlation determination process).

In the last, there is executed a process to search recursively only the low correlation pixels for a motion vector using a low correlation filter.

Figure 10:
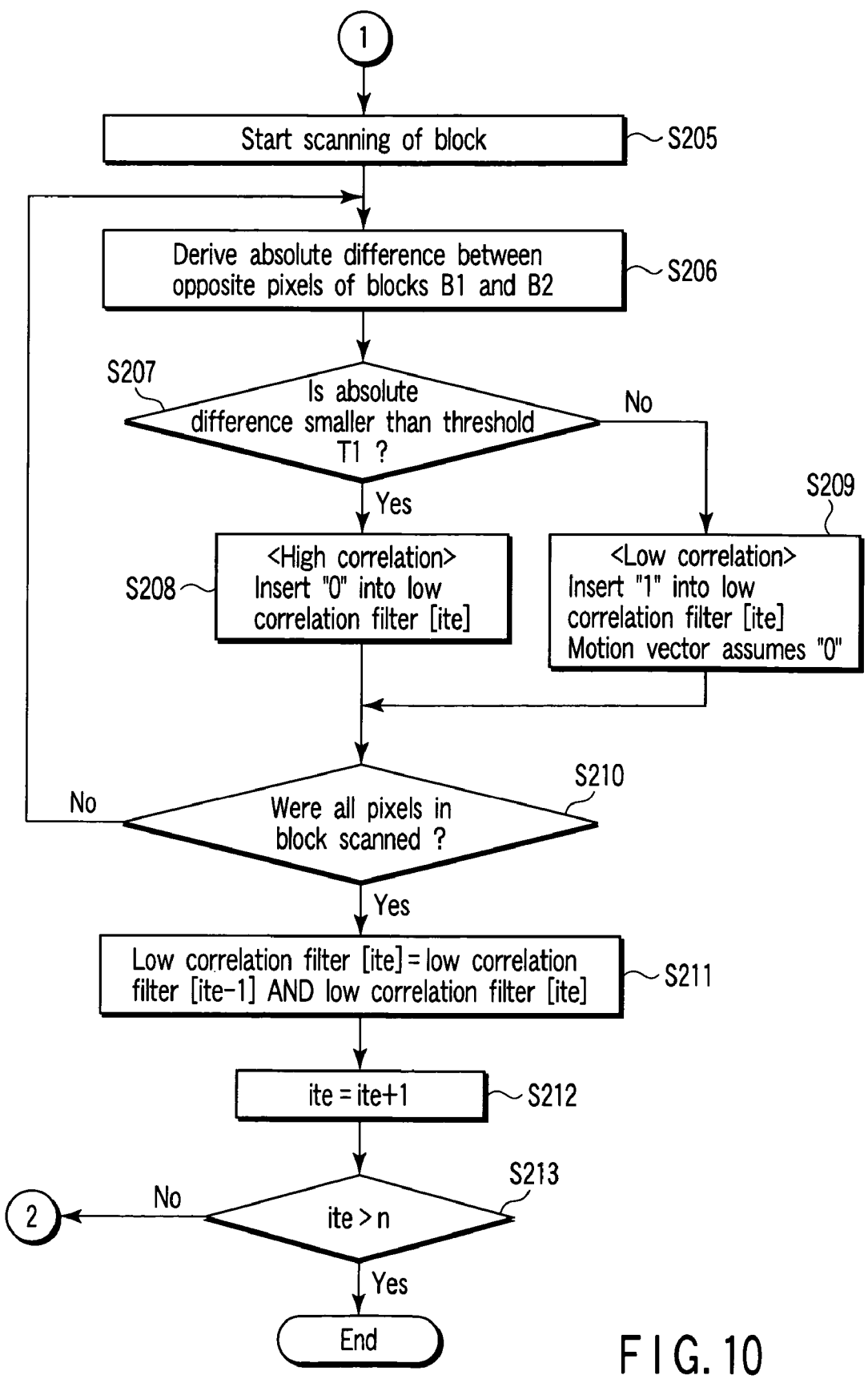
FIG. 10 is a flowchart of a detailed following procedure of the motion estimation process in the first embodiment.
Figure 11:
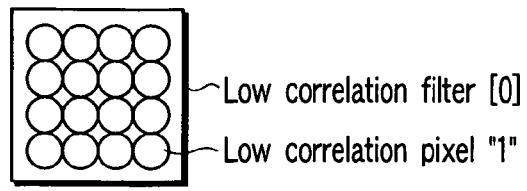
FIG. 11 is a diagram of describing an initial mismatch filter in the first embodiment.

A detailed procedure of the motion estimation process is described with reference to FIGS. 9 and 10. At first, iteration is started. With assumption that an iteration variable assumes ite and a digital filter of the same shape and size as the to-be-interpolated block B0 is used as a low correlation filter, "1" indicating that all the block is low correlation pixels is inserted in a low correlation filter [0] of initial iteration as shown in FIG. 11 (step S201). [α] indicates iteration a (ite=α). Although the iteration is processed several times repeatedly, at first the iteration 1 (ite=1) assumes to be processed.

Figure 12:
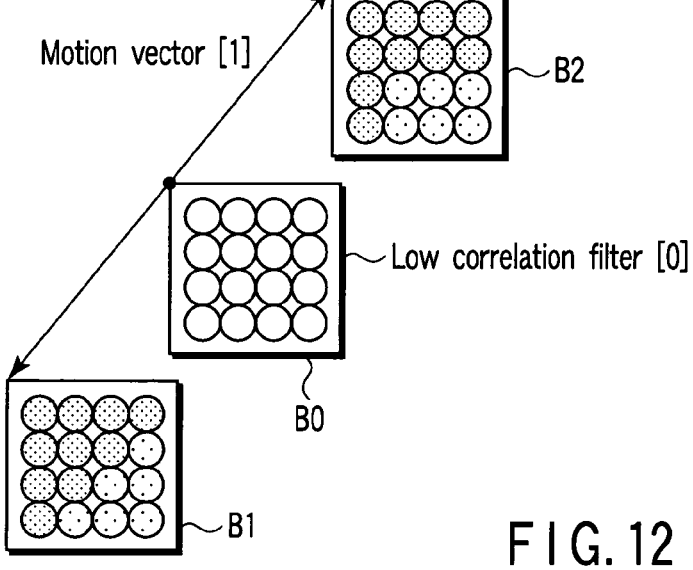
FIG. 12 is a diagram of explaining a motion vector detection process of iteration 1 in the motion estimation process in the first embodiment.

As shown in FIG. 7, the image blocks of the reference frame P1 and the image blocks of the reference frame P2 are searched symmetrically around the to-be-interpolated block B0 in the interpolation frame position for a pair of image blocks B1 and B2 having the maximum correlation. A motion vector [1] between the searched image blocks B1 and B2 is derived (step S202). In the case of correlation operation, only low correlation pixels whose values is "1" in the low correlation filter are subjected to operation as shown in FIG. 12. Now, since all of the pixels in the low correlation filter [0] are "1", all of the pixels of the image block are subjected to correlation operation. The image blocks B1 and B2 located by the motion vector [1] are derived from the reference frame P1 and P2 respectively (step S203).

In the sub-routine 3, the optimum region determination threshold T1 corresponding to luminance distribution is determined by the absolute difference between the pixel values of paired opposite pixels of the image blocks B1 and B2 (step S204). The determination process of the region determination threshold will be described in detail later.

Figure 13:
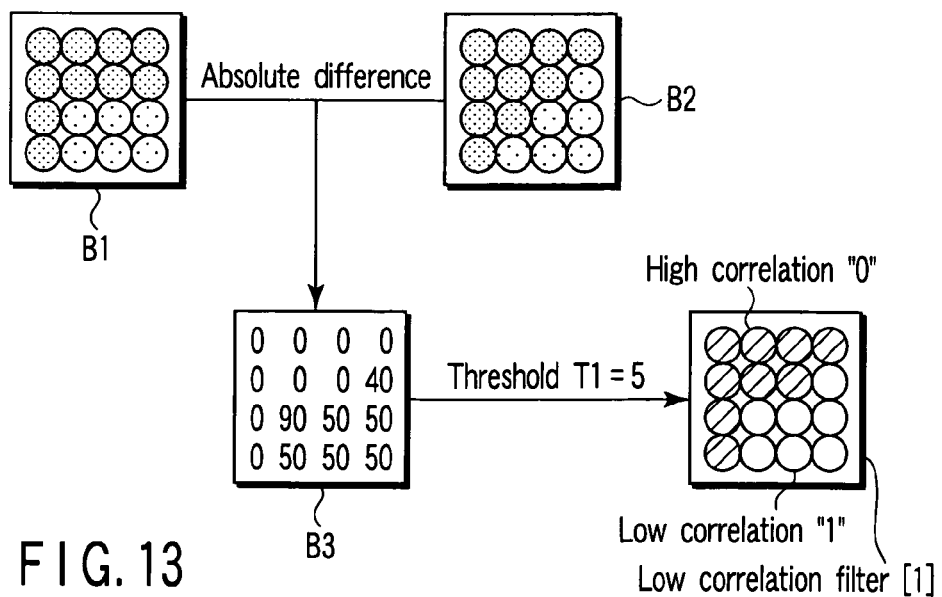
FIG. 13 is a diagram of explaining a high correlation determination process of iteration 1 in the motion estimation process in the first embodiment.

Next, the image blocks B1 and B2 are to be scanned (step S205). In this time, the high correlation determination process is executed. In the high correlation determination process, an absolute value difference between the pixel values of paired pixels in opposite pixel positions (pixel positions equal to each other with respect to the opposite pixel blocks) is obtained with respect to the image blocks B1 of the reference frame P1 and the image blocks B2 of the reference frame P2 which are prescribed by the motion vector [1] as shown in FIG. 13 (step S206).

The absolute difference is compared with the threshold T1 (step S207). When the absolute difference is smaller than the threshold T1, the paired opposite pixels of the image block B1 and B2 are determined to be high correlation pixels. "0" is inserted into the low correlation filter [1] (step S208). When the absolute difference is not less than the threshold T1, the paired opposite pixels of the image block B1 and B2 are determined to be low correlation pixels. "1" is inserted into the low correlation filter [1] (step S209). The process of steps S206 to S209 is repeated till it is determined in step S210 that all pixels of the image block have been scanned, and then the correlation determination process is ended.

Upon completion of the high correlation determination process, the low correlation filters [1] and [0] are ANDed (logical-multiplied), resulting in a new low correlation filter [1] (step S211). With the above, the iteration 1 is completed and the process returns to the motion vector estimation process recursively.

In other words, the iteration ite is increased by one (step S212). If the iteration ite exceeds n (an integer), that is, the determination in step S213 is YES, a repetitive operation is ended. Otherwise, the process returns to step S202 to repeat the motion vector estimation process.

Figure 14:
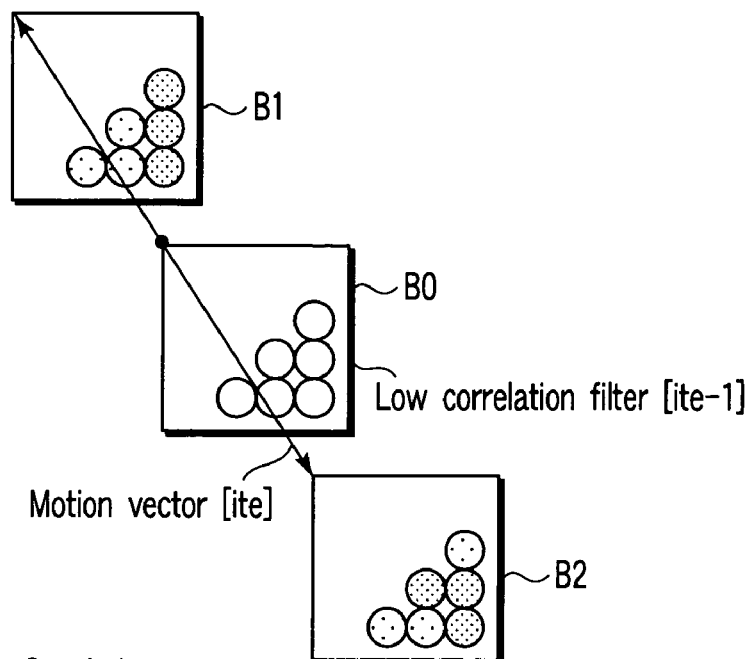
FIG. 14 is a diagram of explaining a motion vector detection process of iteration ite in the motion estimation process in the first embodiment.

In the motion vector estimation process after step S212, an image block on the reference frame P1 and an image block on the reference frame P2 are searched symmetrically around the to-be-interpolated block B0 in the interpolation frame position as shown in FIG. 7 for a pair of image blocks B1 and B2 with the maximum correlation. A motion vector [ite] between the paired image blocks is obtained (step S202). In the case of computing the correlation, only the pixels whose pixel value is "1" in the low correlation filter [ite-1] as shown in FIG. 14 are subjected to correlation operation. The image blocks B1 and B2 located by the motion vector [ite] are extracted from the reference framed P1 and P2 respectively (step S203).

The optimum region determination threshold T1 corresponding to the distribution of pixel values (luminance) is determined from the image blocks B1 and B2 as a subroutine 3 (step S204).

The image blocks B1 and B2 begin to be scanned (step S205) so that the high correlation determination process is executed. The high correlation determination process computes an absolute difference between the paired opposite pixels of the image blocks B1 and B2 of the reference frames P1 and P2 that are prescribed by the motion vector [ite] as shown in FIG. 14 (step S206).

The absolute difference is compared with the region determination threshold T1 (step S207). When the absolute difference is smaller than the threshold T1, the paired opposite pixels of the image blocks B1 and B2 are determined as a high correlation pixel pair, and "0" is inserted in the low correlation filter [ite] (step S208). When the absolute difference is not less than the threshold T1, the paired opposite pixels of the image blocks B1 and B2 are determined as a low correlation pixel pair, and "1" is inserted in the low correlation filter [ite] (step S209). The process of steps S206 to S209 is repeated till all pixels in the image block are scanned in step S210, and the high correlation determination process completes.

Upon completion of the high correlation determination process, the low correlation filters [ite] and [ite-1] are ANDed, resulting in a new low correlation filter [ite] (step S211). The iteration ite is increased by one (step S212). If the iteration ite exceeds n (an integer) in step S213, a repetitive operation is ended. Otherwise, the process returns to step S202 to repeat the motion vector estimation process. At the time of ending the repetitive operation, a motion vector group (motion vectors [i](i, . . . , n)) and a high correlation filter group (low correlation filters [i](i . . . , n)) are provided.

<Motion Compensation Process>

The motion compensation process of step S104 that is a subroutine 2 in FIG. 3 will be described referring to FIG. 16. At first, the iteration variable ite is set at 1 as an initial value (step S301). The image blocks B1 and B2 on the reference frames P1 and P2 that are located by the motion vector [ite] and in geometrical point symmetry position around the to-be-interpolated block B0 are extracted (steps S302, S303).

The pixels in the image block begin to be scanned (step S305), and an average of the pixel values of the paired opposite pixels of the image blocks B1 and B2 (average pixel value) is computed (step S306). The value of the low correlation filter [ite] is checked (step S307). If the value of low correlation filter [ite] is "0", the average pixel value is copied as an interpolation pixel value to the pixel position corresponding to the value "0" of the low correlation filter [ite] (step S308). When the value of the low correlation filter [ite] is 1, a copy is not done.

The process of steps S307 and S308 is repeated till it is determined in step S309 that all pixels of the image block have been scanned. Then, the iteration variable ite is increased by one (step S310). When the iteration variable ite exceeds n (step S311 is YES), the repetitive operation is finished. Otherwise, the process returns to step S302.

Figure 6:
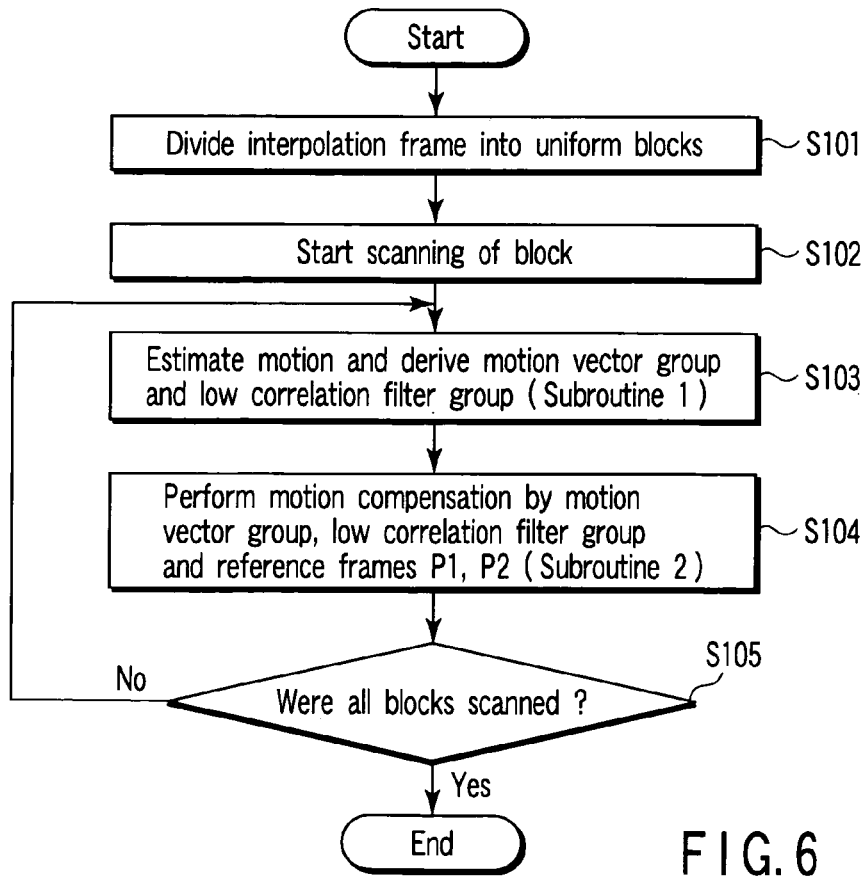
FIG. 6 is a general flowchart of a process routine of a frame interpolation in the first embodiment.
Figure 7:
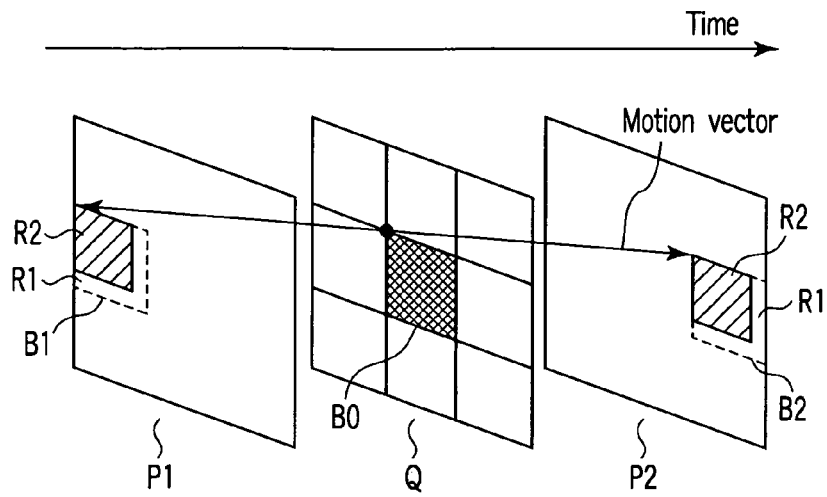
FIG. 7 is a diagram of describing an image block extraction of a reference frame process and a motion estimation process thereof in the first embodiment.
Figure 9:
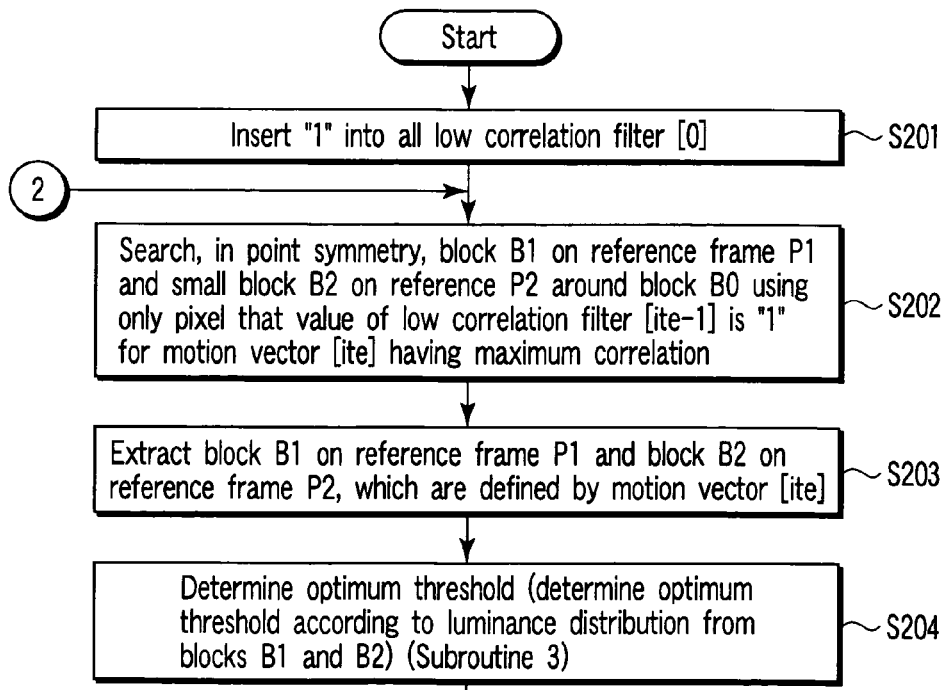
FIG. 9 is a flowchart of a detailed procedure of the motion estimation process in the first embodiment.
Figure 16:
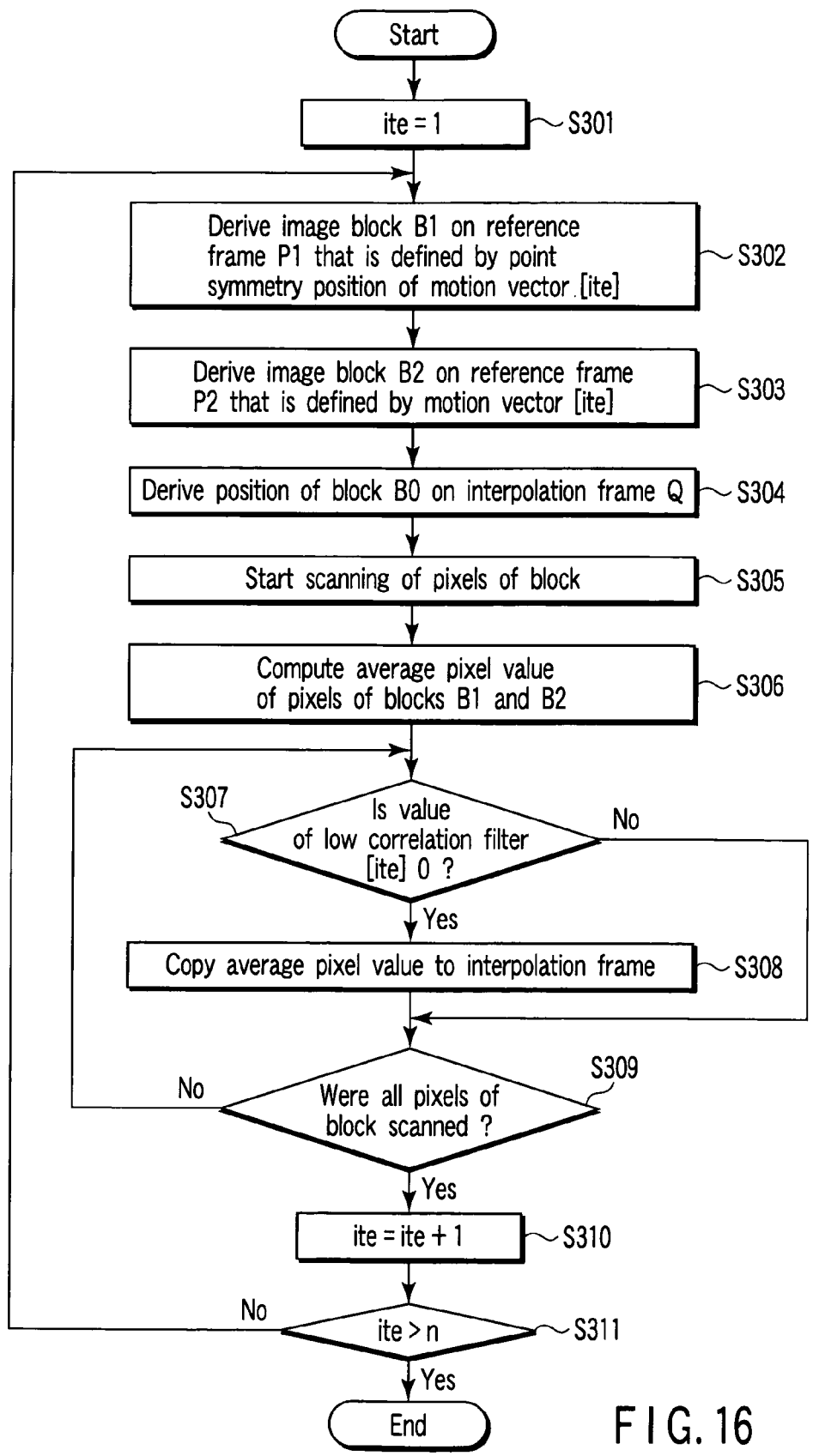
FIG. 16 is a flowchart of a detailed procedure in a motion compensation process in the first embodiment.

Upon completion of the repetitive operation, a process from step S201 in FIG. 9 to step S213 in FIG. 16 is executed till the entire of the to-be-interpolated block B0 provided by step S101 in FIG. 6 is scanned. When the entire of the to-be-interpolated block B0 has been scanned, a motion compensation process completes. As a result, an interpolation frame Q is generated. The generated interpolation frame Q is sent to the display unit 17 shown in FIG. 1, and is interposed between the reference frames P1 and P2 from the frame memory 11. As a result, the interpolation frame Q is displayed as an image along with the reference frames P1 and P2.

<Process for Determining Region Determination Threshold>

The process for determining a region determination threshold in step S204 in FIG. 9 will be described in detail. As described in FIGS. 4 and 5, the number of pixels in the high correlation region (say the high correlation pixel number) and an average SAD (Sum of Absolute Differences) of the high correlation pixels in the high correlation region change according to the region determination threshold used for dividing each of the image blocks B1 and B2 into the high correlation region R1 and the low correlation region R2. In other words, the high correlation pixel number and the average SAD can be considered to be a function dependent on the threshold. Consequently, determining an evaluation function using the high correlation pixel number and average SAD, the optimum region determination threshold can be determined according to the evaluation function. This is regarded as optimization problem concerning a candidate of the region determination threshold (referred to as the candidate threshold).

When the candidate threshold assumes T, the number of high correlation pixels increases with an increase of T. When T>"255", the high correlation pixel number becomes maximum, that is, the whole image block has high correlation pixels. The average SAD increases with an increase of T, too. The larger the high correlation pixel number is, the higher the evaluation. In contrast, the smaller the average SAD is, the higher the evaluation is. Therefore, even if the sum of the high correlation pixel number and the average SAD is used as an evaluation function, it is not effective for the evaluation of the candidate threshold T. Considering the evaluation function expressed by the following equation.

$$\text{Estimation function} = \frac{\text{Averaged SAD of high correlation pixel}}{\text{The number of high correlation pixels}} \quad (1)$$

Assuming that the smaller the evaluation function of equation (1) is, the better the evaluation is. In this case, when a numerator is smaller than a denominator, the evaluation becomes high. Therefore, the smaller the average SAD of the pixel values of high correlation pixels is and the larger the number of high correlation pixels is, the higher the evaluation becomes. Accordingly, an appropriate evaluation function should be obtained in the case of this example. Linear coupling of separate parameters (the high correlation pixel number and the average SAD in this case) contains a problem that it is difficult to decide a coupling weighting factor. For this reason, it is difficult to determine the evaluation function based on the sum of the high correlation pixel number and the average SAD.

If it is the evaluation function as expressed by for example the equation (1), there is no parameter such as coupling weighting factor exists, resulting in making it possible to simplify a design.

The actual evaluation function of the third block B3 is designed according to the equation (1) for the high correlation pixel as follows.

$$E[T] = \frac{SAD_{ave}(T)}{\sum_{x \in B} \sigma(dif(x), T)} \quad (2)$$

$$SAD_{ave}(T) = \frac{\sum_{x \in B} dif(x)\sigma(dif(x), T)}{\sum_{x \in B} \sigma(dif(x), T)}$$

$$\sigma(d, T) = \begin{cases} 1 & (d < T) \\ 0 & (\text{otherwise}) \end{cases}$$

$$dif(x) = (f_{mb1}(x) - f_{mb2}(x))$$

f(x) is assumed for a luminance value when a relative coordinate of the image blocks B1 and B2 (size assumes B) is defined as x. T is the above-mentioned candidate threshold. "d" indicates a differential value, and α expresses a part of high or low correlation determination. The denominator of E[T] of the equation (2) represents the high correlation pixel number, and a numerator represents the average SAD.

Consequently, optimization problem can result in solving a problem in minimizing the candidate threshold T with respect to the evaluation function E.

$$\min_{T} E[T] = \frac{SAD_{ave}(T)}{\sum_{x \in B} \sigma(dif(x), T)} \quad (3)$$

Various one-dimensional minimizing methods can be used because equation (3) includes one-dimensional minimization problem. However, since the evaluation function becomes a discontinuity function in a part of high or low correlation determination in equation (2), it is impossible to apply a minimizing technique to use an gradient in this condition. Consequently, if the high or low correlation determination α (d, T) is defined by a sigmoid function, the evaluation function can make a continuous function, and a gradient method is applicable by using definitions of equation (4).

$$\sigma(d, T) = \frac{1}{1 + e^{-\alpha(d-T)}} \quad (4)$$

One dimensional golden section method is used in this example. The golden section method is the most basic technique, and does not use an gradient. Brief description of minimization of this method is as follows. When three points are given in an enclosure in each frame, a point to be checked next is a point moving from a center point to a wider section by 0.38197 times (golden section ratio). Even if beginning three points do not become a golden section ratio, it is repeated to select a point for the wider section with the golden section ratio, it is converged in a ratio of the self-duplication immediately and a minimum point is obtained by repeating recursion to voluntary precision. This is one-dimensional golden section method. The evaluation function can be modified from equation (2) to the following equation (5).

$$E[T] = \frac{\sum_{x \in B} dif(x)\sigma(dif(x), T)}{\left(\sum_{x \in B} \sigma(dif(x), T)\right)^2} \quad (5)$$

The denominator of equation (5) expresses the high correlation pixel number. This is a monotonic increase function concerning the candidate threshold T having a positive value because it is a function obtained by adding 1 and [[squaring the result]]. Because the numerator of equation (5) is a sum of absolute differences, it is a monotonic increase function concerning the candidate threshold T having a positive value, too. Accordingly, it is understood that a change of evaluation function is determined by an inclination difference between the numerator and denominator.

In the present embodiment, the value Topt of the candidate threshold T that the evaluation function becomes minimum is determined as the optimum region determination threshold T1. The evaluation function becoming a bottom convexity function occurs when increment of the denominator exceeds increment of the numerator at the time of T≦Topt, and increment of the numerator exceeds increment of the denominator at the time of T>Topt.

This can attain when the high correlation pixel region has a uniform low difference. In other words, it can attain when a plurality of movements are in the image block and the image block can be completely divided. More specifically, that the high correlation pixel region has a uniform low difference at the time of T≦Topt means that increment of the numerator of evaluation function is small. For this reason, increment of the denominator exceeds that of the numerator relatively, resulting in that the evaluation function becomes a bottom convexity function.

Figure 17:
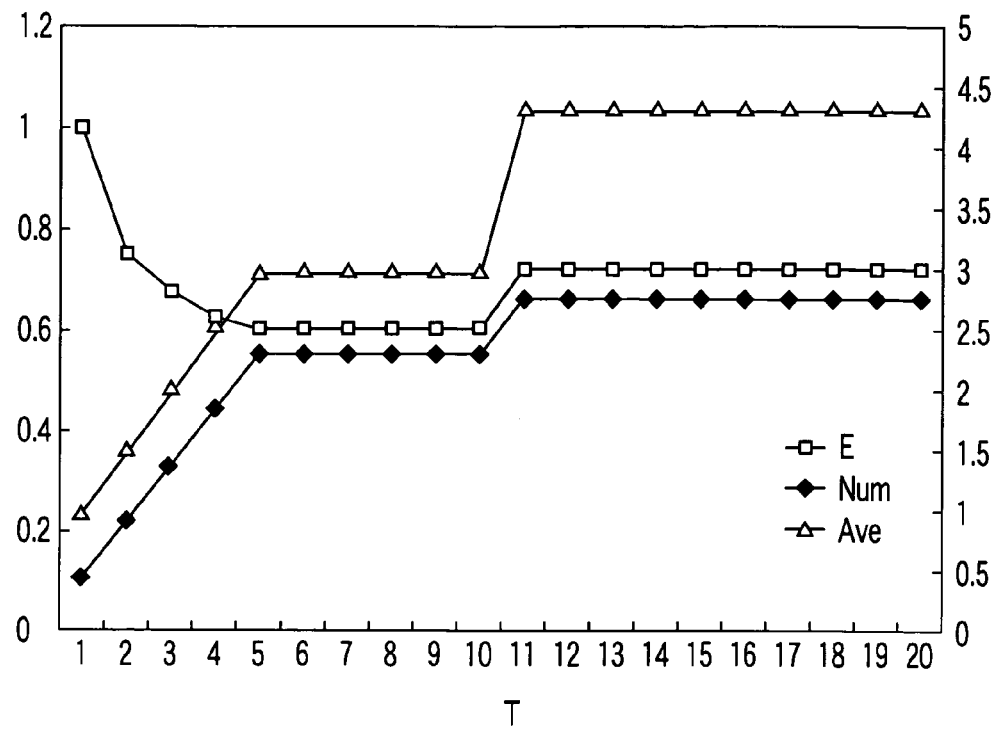
FIG. 17 is a diagram showing an example of a pattern wherein a plurality of movements are included in the first and second image blocks, and the image blocks can be justly divided in region in the first embodiment.

FIG. 17 shows simulation results expressing changes of the number (Num) of high correlation pixels with respect to the candidate threshold T, the average SAD (Ave), and evaluation function E, in a pattern that the image block can be divided into the high correlation region and the low correlation region because of a plurality of movements in the image block. In this case, since two movements are in the image block, the image block can be easily divided into the high correlation region conforming to one movement and the low correlation region conforming to the other. As shown in FIG. 17, the evaluation function E becomes a bottom convexity function.

Figure 18:
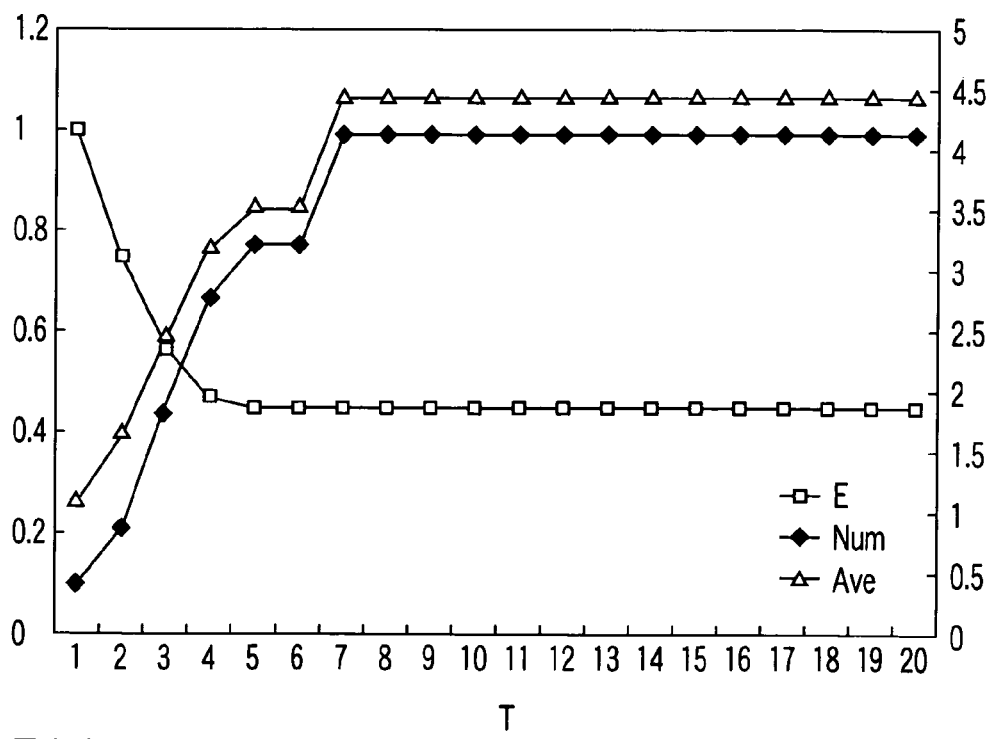
FIG. 18 is a diagram showing an example of a pattern wherein a plurality of movements are included in the first and second image blocks but the image blocks each cannot be justly divided in region in the first embodiment.

On the other hand, FIG. 18 shows simulation results similar to FIG. 17 in a uniform pattern that a plurality of movements are not in the image block, and the image block is not divided into the high correlation region and the low correlation region. When observing the functional shape of the evaluation function E, it is found that it becomes a functional shape which does not almost indicate a bottom convexity. FIGS. 17 and 18 show the candidate threshold T in a horizontal axis, the high correlation pixel number (Num) and the value of the evaluation function E in a left vertical axis, and the value of the averaged SAD (Ave) in a right vertical axis.

It is similar to the above description that the region division can be correctly done as shown in FIG. 4 or cannot be correctly done as shown in FIG. 5, when using the fixed region determination threshold. In contrast, when the optimum region determination threshold T1 is determined according to the present embodiment, the region division is always justly done * as shown in FIGS. 19 and 20.

Figure 19:
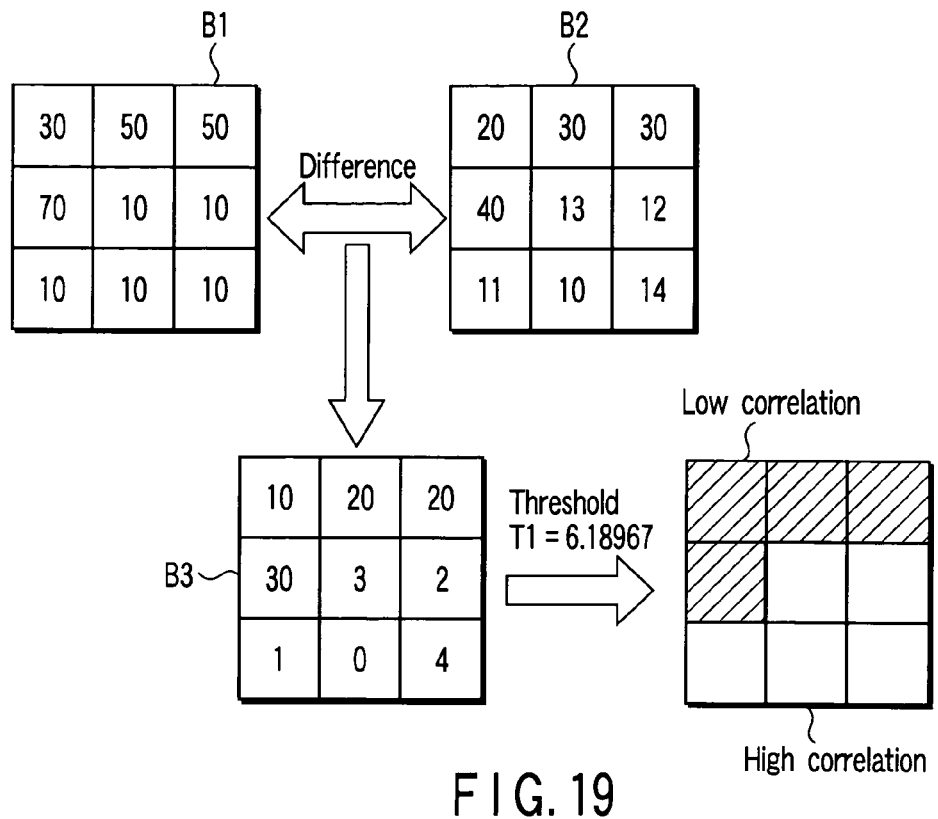
FIG. 19 is a diagram showing an example of dividing the image blocks of two reference frames corresponding to the pattern of FIG. 17.
Figure 20:
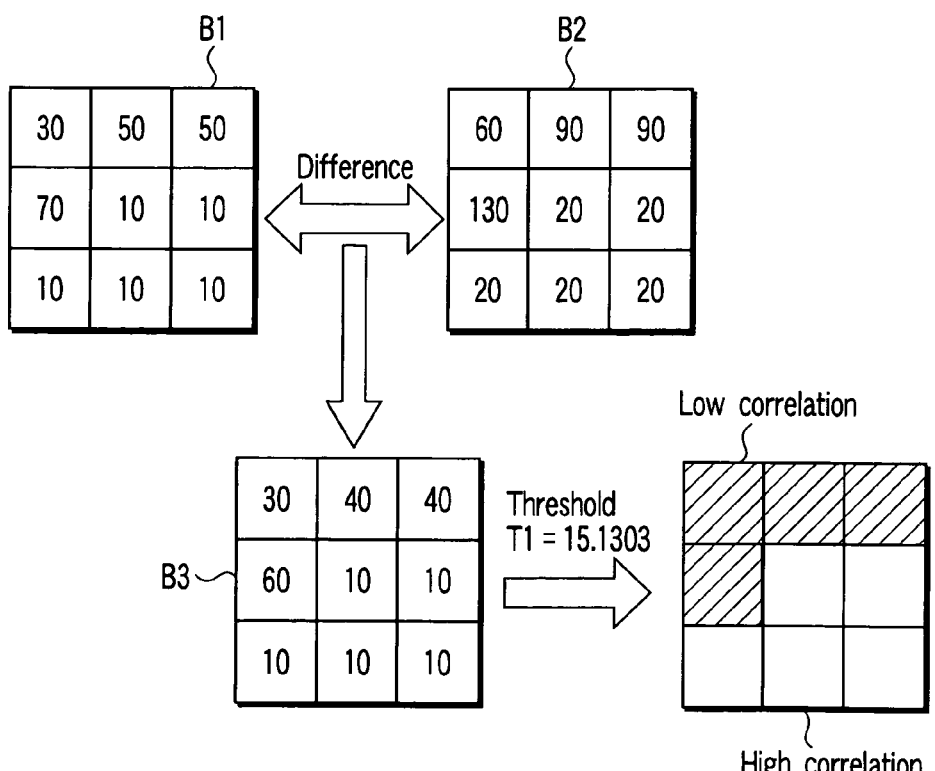
FIG. 20 is a diagram showing an example of dividing the image blocks of two reference frames corresponding to the pattern of FIG. 18.

FIG. 19 shows a state of region division when the candidate threshold Topt (T=6.18967) that the evaluation function E becomes minimum is assumed as the region determination threshold T1 in correspondence with a simulation result of FIG. 17. FIG. 20 shows a state of region division when the candidate threshold Topt (T=15.1303) that the evaluation function E becomes minimum is assumed as the region determination threshold T1 in correspondence with a simulation result of FIG. 18. In either case, it is found that the region division is done adequately according to luminance distribution of the image block.

Figure 21:
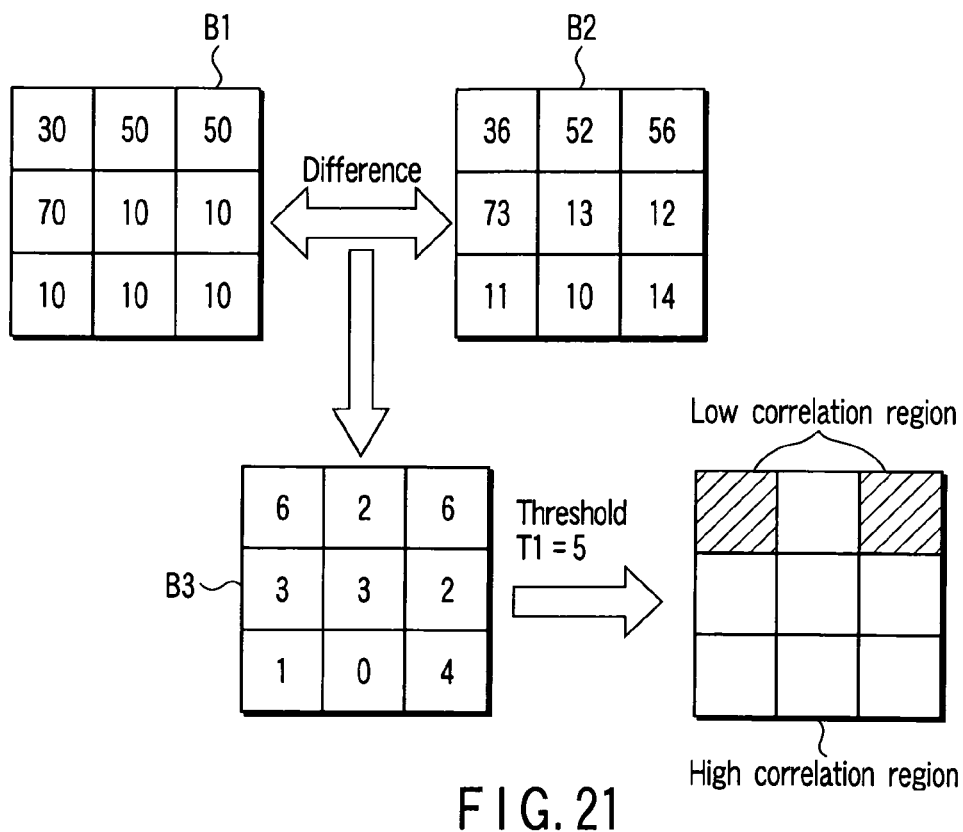
FIG. 21 is a diagram showing another example of dividing the image blocks of two reference frames.
Figure 22:
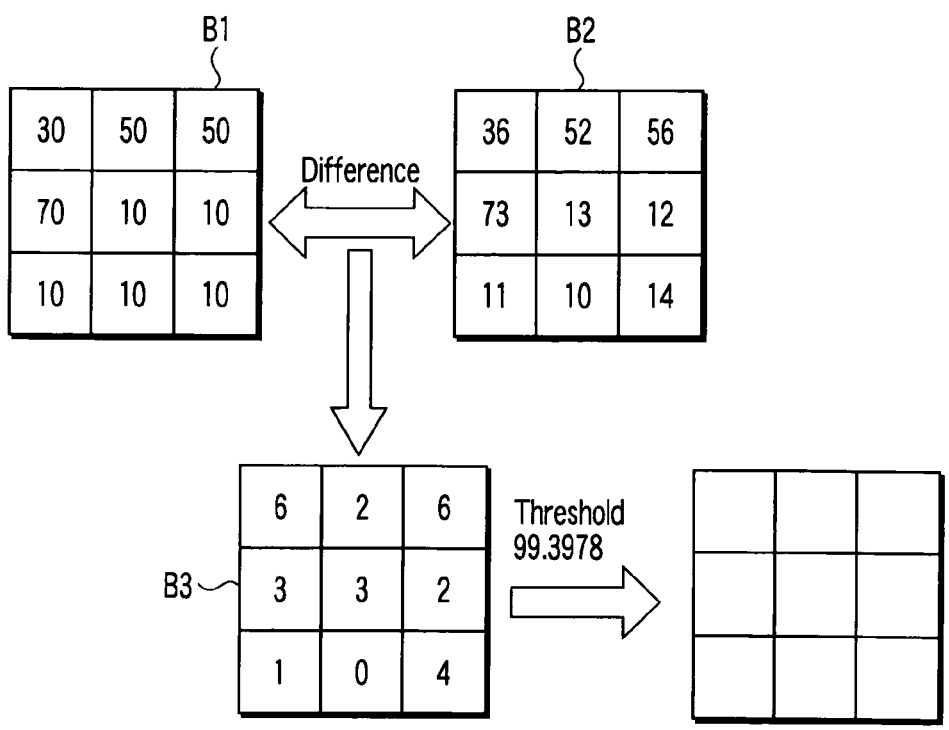
FIG. 22 is a diagram showing another example of dividing the image block of two reference frames.

On the other hand, FIG. 21 shows a state of region division when the pixel values of the paired opposite pixels of the image blocks B1 and B2 are further nearer than in the case of FIG. 4, and the region determination threshold T1 is set at "5" with respect to the image block B3 configured with pixels of the absolute difference. In this case, the low correlation pixels are scattered about, resulting in producing a noise with a state that the low correlation regions are separated.

In contrast, when the candidate threshold Topt by which the evaluation function E is minimized is obtained according to the present embodiment, it becomes a very large value such as Topt=99.3978. When this candidate threshold assumes the region determination threshold T1, the image block B3 is not divided into the high correlation region and the low correlation region as shown in FIG. 21. However, if the image block B3 is a flat pattern that the pixel value is not almost changed, it is not necessary to divide ever the image block B3 into the high correlation region and the low correlation region. For this reason, even if Topt has a large value, it is no problem.

A concrete procedure of the region determination threshold determination process will be described referring to FIG. 23. At first, the absolute difference between the paired opposite pixels of the image blocks B1 and B2 is derived, and then the image block B3 having the absolute difference as the pixel value is obtained (step S401).

The initial value xa, xb and xc of three points used for searching for the minimum value are derived (step S402). xa=1, xb=an average value (average pixel value) of pixel values of the image block B3, and xc=256s.

The threshold T1min for minimizing the evaluation function E of equation (2) is derived by one-dimensional minimizing method to assume xa, xb, xc to be an initial value (step S403).

Next, the range of the threshold T1min is adjusted. If T1min<1s, T1min=1, and if T1min>256s, T1min=256 (steps S404, S405, S406, S407). T1min after range adjustment is output as the optimum region determination threshold T1 (step S408).

According to the present embodiment as described above, the optimum region determination threshold can be determined in a simple method by setting the optimization method (equation (3)) according to luminance distribution in the image block, and resolving itself into one-dimensional minimization method. In this way, the image blocks B1 and B2 are divided into the high correlation region R1 and the low correlation region R2 using the determined region determination threshold, and then the pixel value of the high correlation region is copied as an interpolation pixel value to the to-be-interpolated block B0 by a motion compensation process. As a result, it is possible to perform a frame interpolation without a block-to-block gap and an image overlapping and by generating an interpolation frame Q that does not almost contain block distortion.

Second Embodiment

Figure 24:
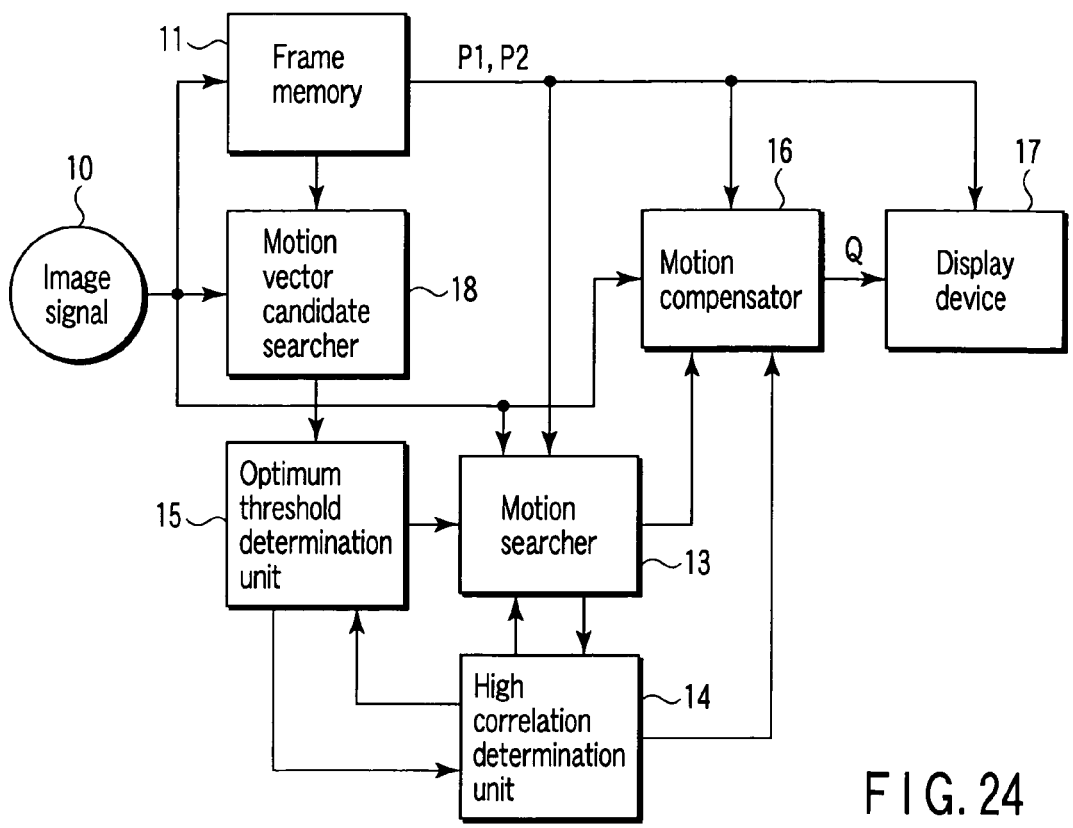
FIG. 24 is a block diagram of an image display system concerning the second embodiment of the present invention.

In the image display system concerning the second embodiment of the present invention as shown in FIG. 24, a motion vector candidate search unit 18 is added to the image display system shown in FIG. 1. When the motion vector candidate search unit 18 searches for a candidate of a motion vector used for setting the optimum region determination threshold value in the optimum threshold determination unit 15.

In searching for the motion vector, the sum of high correlation pixels (Muxumum matching Pel Count, referred as to MPC) as shown hereinafter can be used as an evaluation function.

$$MPC = \sum_{x=1}^{N} \sum_{y=1}^{M} \begin{cases} 1 & (|f_{p1}(x, y) - f_{p2}(x, y)| < T) \\ 0 & (\text{otherwise}) \end{cases} \quad (6)$$

fpi(x, y) indicates a pixel value in the point (x, y) of the reference frame P1, f p2(x, y) a pixel value in the point (x, y) of the reference frame P2, T a threshold (for example, 3, etc.), and (N,M) a size of image. MPC is one focused in a shape such as an object. It is necessary for the threshold T to be set beforehand to MPC. The threshold T should change every image and every location of the image. Consequently, the present embodiment provides a method for optimizing every image block the threshold T in MPC expressed by equation (6).

Figure 25:
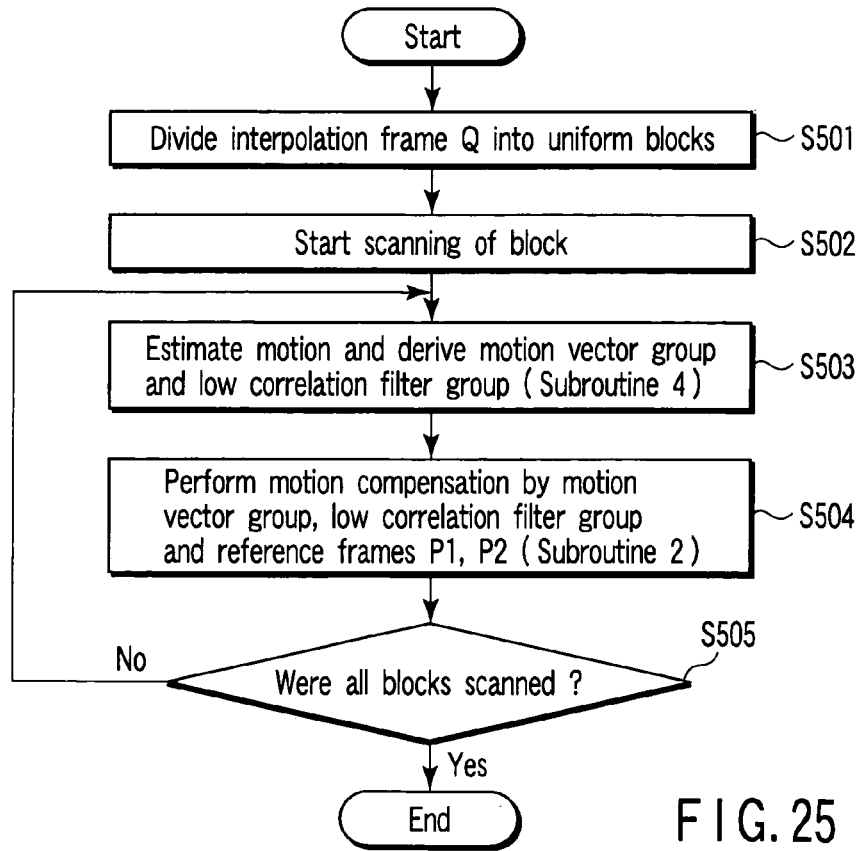
FIG. 25 is a general flowchart of frame interpolation in the second embodiment.

FIG. 25 shows an overall flow of a frame interpolation process including a process for determining the optimum region determination threshold in the present embodiment. Similarly to the first embodiment, the interpolation frame is divided into small regions (to-be-interpolated blocks) B0 of a constant size (step S501). The to-be-interpolated blocks B0 are sequentially scanned (step S502). The process motion estimation (step S503) and the motion compensation (step S504) are repeated every to-be-interpolated block B0 till all of the to-be-interpolated blocks B0 on the interpolation frame have been scanned in step S505. The optimum threshold determination process included in the motion estimation process of step S503 and the motion compensation process of step S504 are similar to the first embodiment.

<Motion Estimation Process>

There will be explained the motion estimation process of step S503 which is a subroutine 4 of FIG. 25. In the motion estimation process, at first, the motion vector are searched for a pair of image blocks having high correlation in the search regions set on the reference frames P1 and P2, to derive motion vector candidates in order of descending correlation degree (motion vector candidate search process).

Subsequently, an optimum motion vector determination threshold T2 is computed using the image blocks of the reference frames P1 and P2 that are located by the motion vector candidate of the maximum correlation (optimum threshold determination process).

The motion vector candidates are searched for the motion vector of high correlation using the motion vector determination threshold T2 according to the sum of high correlation pixels, that is, MPC that is shown in equation (6) (motion vector search process).

The optimum region determination threshold T1 is computed using the image block located by the searched motion vector (optimum threshold determination process).

The correlation between the pixels is determined every pixel using the absolute difference between the pixel values of the paired opposite pixels of the image blocks and the region determination threshold T1 like the first embodiment, to generate the above-mentioned low correlation filter (high correlation determination process). The process to search for a motion vector is recursively done only from pixels (low correlation pixels) determined to be low correlation, using the low correlation filter.

Figure 26:
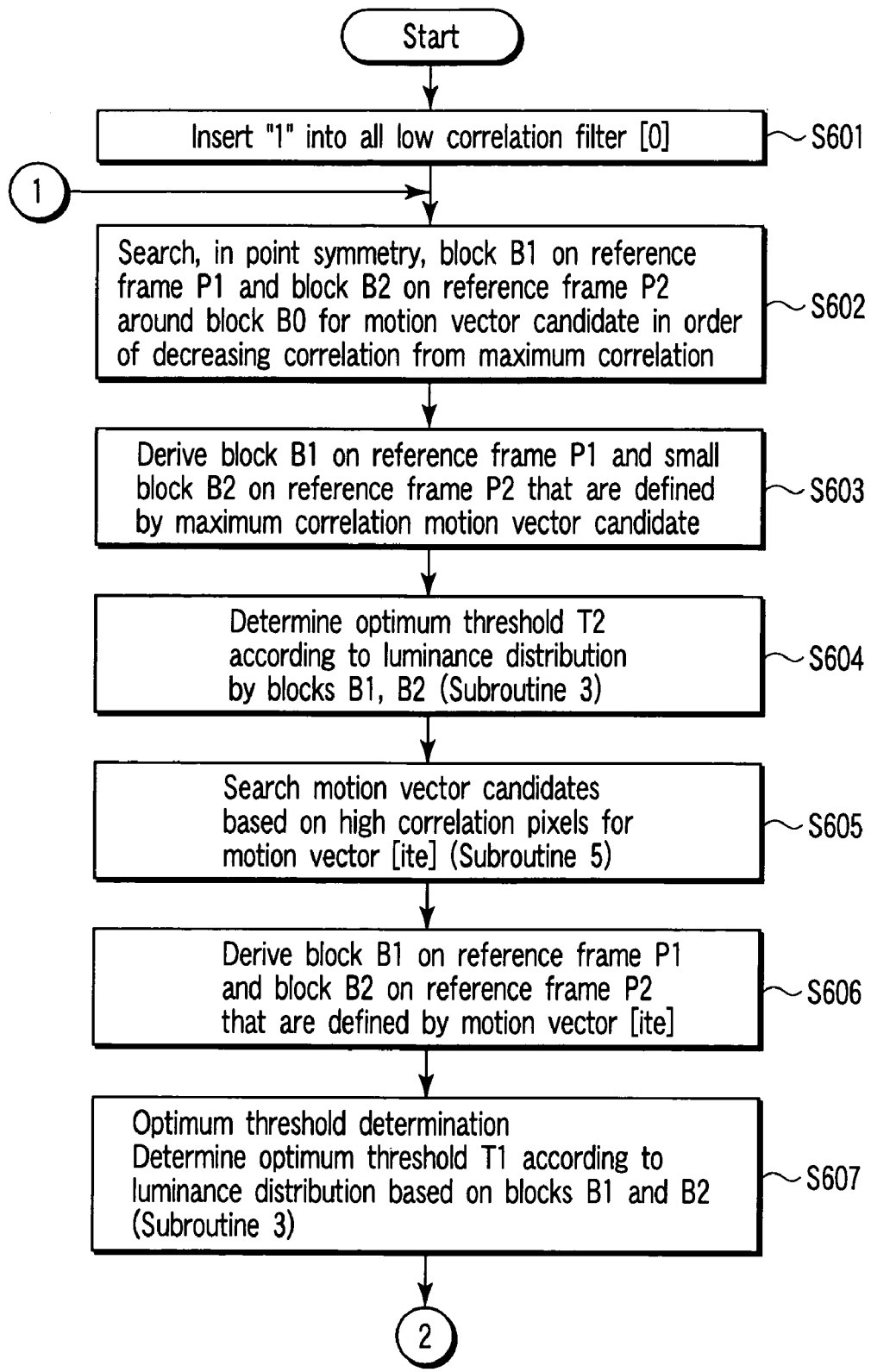
FIG. 26 is a flowchart of a detailed procedure of a motion estimation process in the second embodiment.
Figure 27:
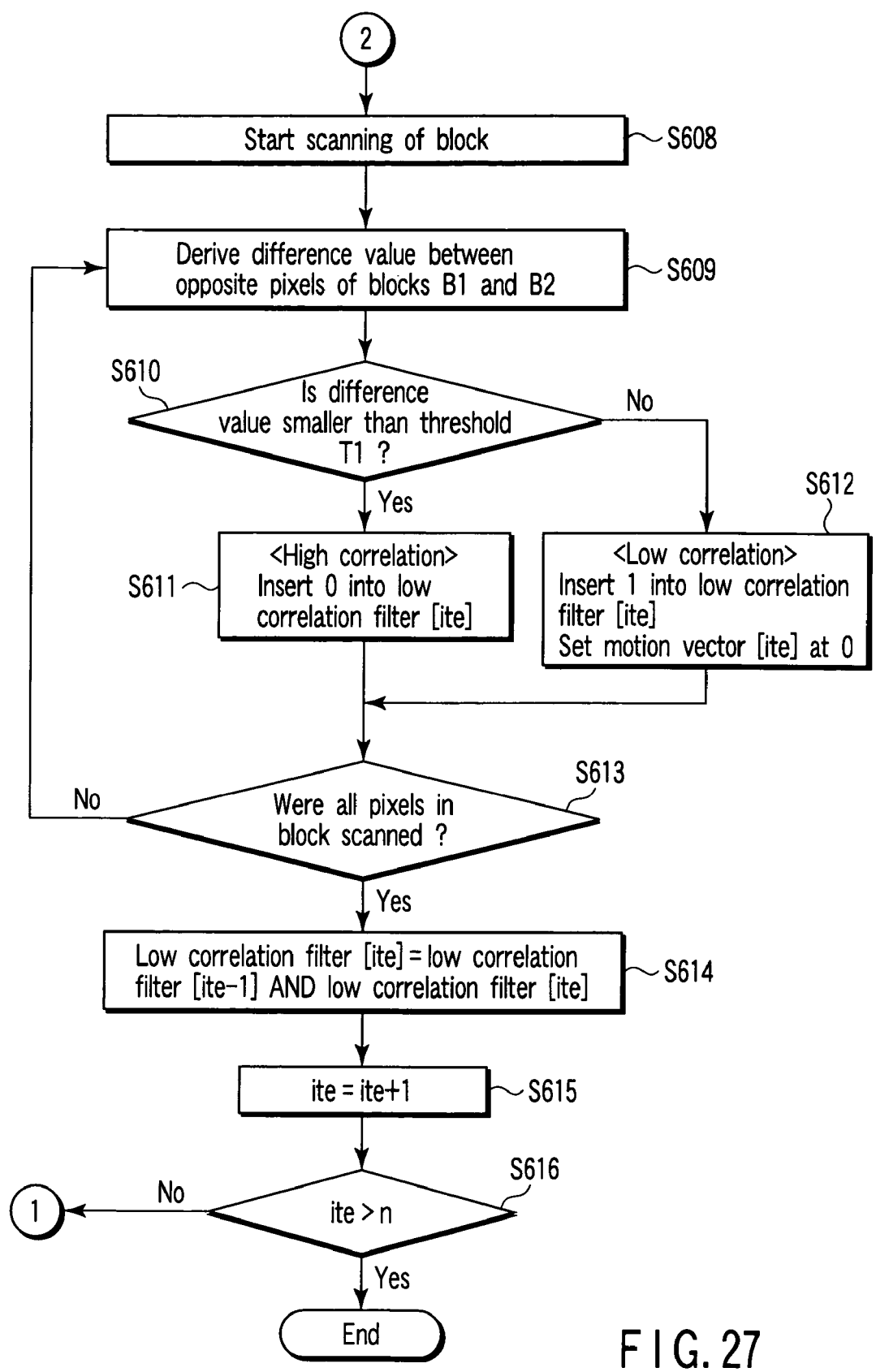
FIG. 27 is a flowchart of the detailed procedure of the motion estimation process in the second embodiment.

A detailed procedure of the motion estimation process is described with reference to FIGS. 26 and 27. At first, iteration is started. An iteration variable is assumed as ite, and a digital filter of the same shape and size as the to-be-interpolated block B0 assumes a low correlation filter. "1" is inserted in all the low correlation filter [0] of an initial iteration as shown in FIG. 11 (step S601). [α] shows that it is iteration a (ite=α). The iteration is recursively repeated many times, but first the iteration 1 (ite=1) is considered.

(Candidate Motion Vector Estimation Process)

As shown in FIG. 7, the image blocks of the reference frame P1 and the image blocks of the reference frame P2 are searched in geometrical symmetry around the to-be-interpolated block B0 in the interpolation frame position for a pair of image blocks B1 and B2 having the maximum correlation. The motion vector [1] between the searched image blocks B1 and B2 is derived (step S602). SAD can be used in the case of correlation operation. In the case of the correlation operation, the value of the low correlation filter [ite-1] operates only about "1" pixel as shown in FIG. 12.

(Optimum Threshold Determination Process: Subroutine 3)

The image block B1 on the reference frame P1 and the image block B2 on the reference frame P2 that are prescribed by the motion vector candidate of the high correlation are extracted (step S603). The optimum motion vector determination threshold T2 dependent on the luminance distribution is determined using the image blocks B1 and B2 (step S604).

(Motion Vector Search Process: Subroutine 5)

The motion vector [ite] of high correlation is derived from motion vector candidates obtained in step S605 by searching for the high correlation pixels using the motion vector determination threshold T2 (step S605).

(Optimum Threshold Determination Process: Subroutine 3)

The image block B1 on the reference frame P1 and the image block B2 on the reference frame P2 that are prescribed by the motion vector [ite] are extracted (step S606). The optimum region determination threshold T1 dependent on the luminance distribution is determined using the blocks B1 and B2 (step S606).

(High Correlation Determination Process)

The image blocks B1 and B2 start to be scanned (step S608) to execute the high correlation determination process.

Figure 15:
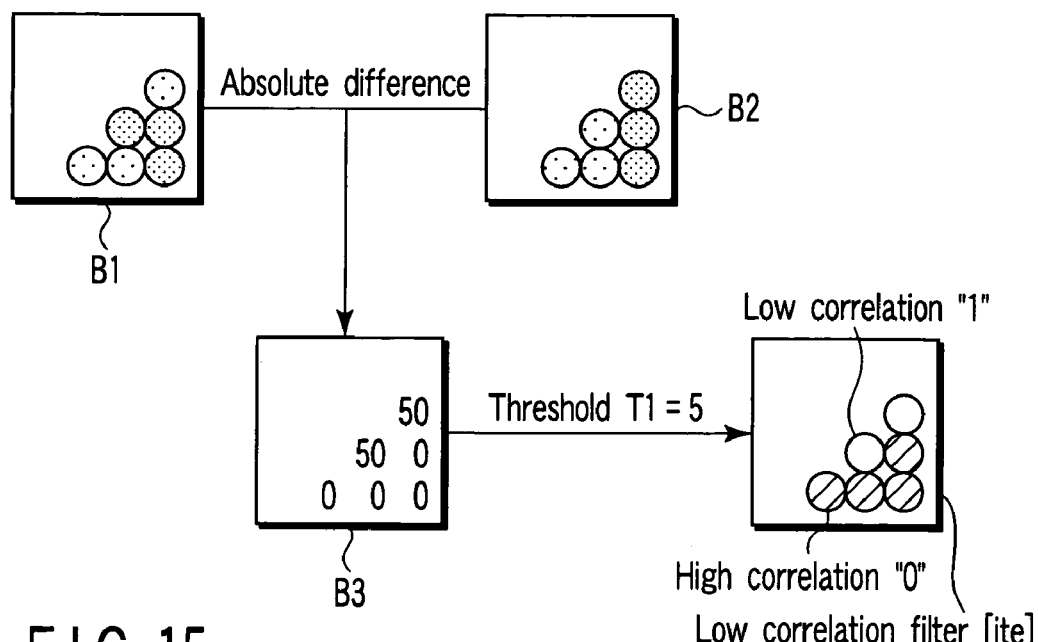
FIG. 15 is a diagram of explaining a correlation determination process of iteration ite in the motion estimation process in the first embodiment.

In the high correlation determination process, the absolute difference between the paired opposite pixels is obtained on the image block B1 on the reference frame P1 and the image block B2 on the reference frame P2 that are prescribed by the motion vector [ite] as shown in FIG. 15 (step S609).

The absolute difference is compared with the region determination threshold T1 (step S610). When the absolute difference is smaller than the threshold T1, the paired opposite pixels of the image blocks B1 and B2 are determined to be high correlation pixels, and "0" is inserted in the low correlation filter [ite] (step S611). When the absolute difference is not less than the threshold T1, the paired opposite pixels of the image blocks B1 and B2 are low correlation pixels, and "1" is inserted in the low correlation filter [ite] (step S612). The process of steps S609 to S612 is repeated till it is determined in step S613 that all pixels of the image block have been scanned, and then the high correlation determination process is ended.

Upon completion of the high correlation determination process, the low correlation filters [ite] and [ite-1] are ANDed, resulting in a new low correlation filter [ite] (step S614). The ite is increased by one (step S615). If ite exceeds n (an arbitrary integer number) in step S616, the repetitive operation is ended. Otherwise, the process returns to step S601 to perform the motion vector estimation process. When the repetitive operation is ended, a group of motion vectors (motion vectors [i] (i=1, . . . , n)) and a group of low correlation filters (low correlation filters [i] (i=1, . . . , n)) are provided.

<Motion Vector Search Process>

Figure 28:
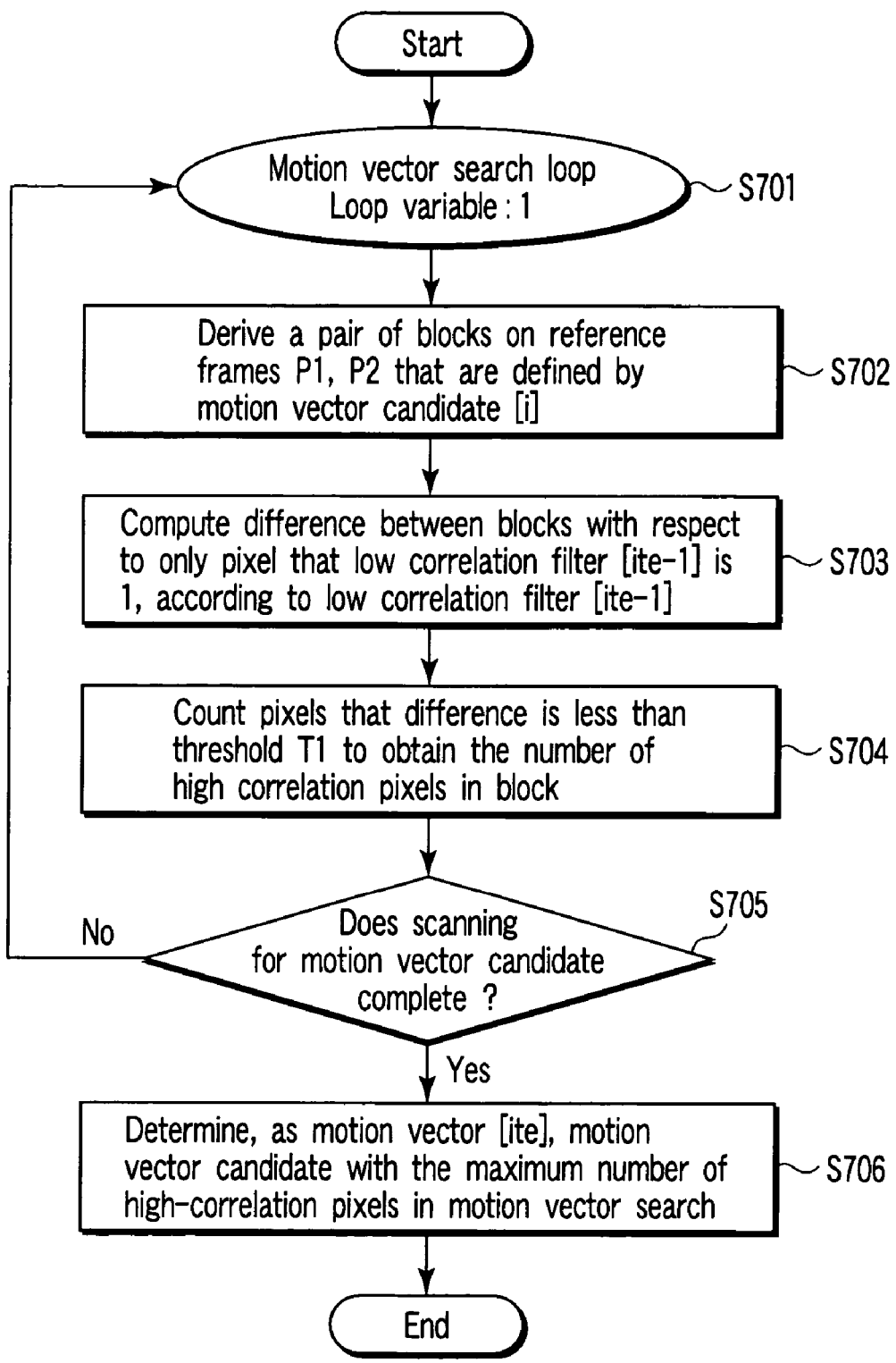
FIG. 28 is a flowchart of a detailed procedure of a motion vector search process in the second embodiment.

The motion vector search process will be described referring to FIG. 28. A motion vector candidate search loop is set in step S701 (loop variable: i), and a pair of image blocks on the reference frames P1 and P2 that are prescribed by the motion vector candidate [i] are extracted (step S702).

The differential value between the blocks is computed only on "1" pixels according to the low correlation filter [ite-1] (step S703). The number of high correlation pixels is obtained using the motion vector determination threshold T2 (step S704). The candidate of the motion vector candidates that has the maximum number of high correlation pixels is determined as the motion vector [ite] (step S706).

Figure 23:
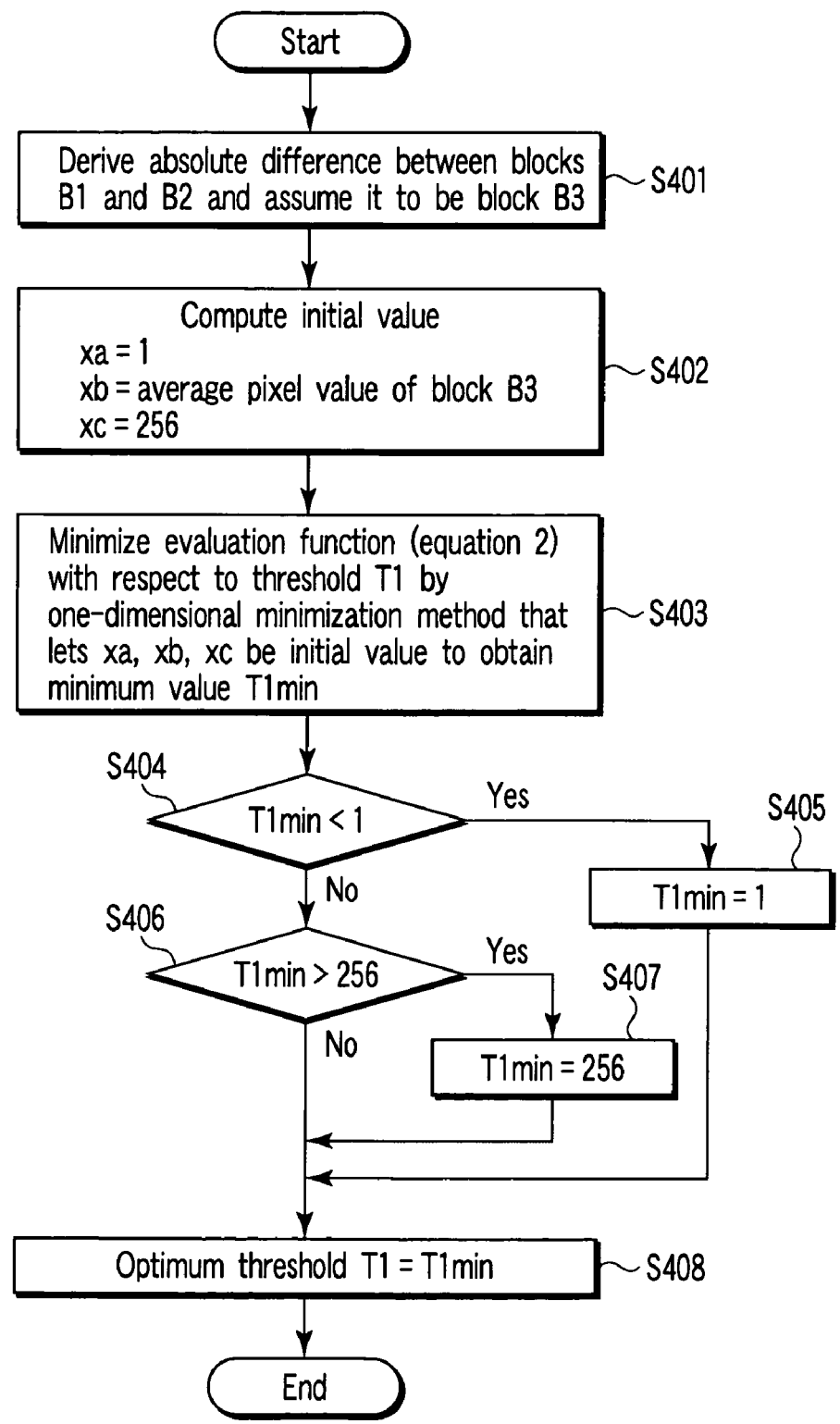
FIG. 23 is a flowchart of a detailed procedure of a region division threshold determination process in the first embodiment.

Upon completion of the repetitive operation, the process is done till all of the to-be-interpolated blocks B0 obtained in step S401 of FIG. 23 are scanned (YES in step S705). If all the image block is scanned, an interpolation frame is provided.

As described above, the present embodiment provides a method for optimizing automatically a threshold used in searching for the high correlation pixels, every block. According to the present embodiment, the high correlation pixels can be searched for every block by an optimum threshold. As a result, a search can be performed with focusing a search range to a shape of an object in the image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image interpolation method of interposing an interpolation image between a first reference image and a second reference image adjacent to the first reference image in terms of time, the method comprising:
searching a motion vector from different pairs of blocks on the first reference image and the second reference image symmetrically;
extracting a first image block and a second image block from the first reference image and the second reference image, respectively, the first image block and the second image block being located by the motion vector;
determining a region determination threshold using an absolute difference between paired opposite pixels of the first image block and the second image block;
extracting from each of the first image block and the second image block a first pixel region that the absolute difference is smaller than the region determination threshold; and
generating an interpolation image based on a pixel value of a second pixel region of the to-be-interpolated block that is obtained from a pixel value of the first pixel region of each of the first image block and the second image block, the second pixel region corresponding to the first pixel region.

2. The method according to claim 1, wherein generating the interpolation image includes determining an interpolation pixel value using the pixel value of the second pixel region, and copying the interpolation pixel value to the to-be-interpolated block to generate the interpolation image.

3. The method according to claim 2, wherein determining the interpolation pixel value includes obtaining an average pixel value of paired opposite pixels of the first regions of the first image block and the second image block as the interpolation pixel value.

4. The method according to claim 1, wherein determining the region determination threshold includes generating a third image block including a plurality of pixels each having the absolute difference as a pixel value, computing an evaluation function by (average sum of absolute differences between high correlation pixels)/(the number of high correlation pixels) on the high correlation pixels each having a pixel value smaller than a candidate threshold, for each of a plurality of candidate thresholds, and determining one of the candidate thresholds that gives a minimum evaluation function as the region determination threshold.

5. The method according to claim 1, which further includes extracting a third pixel region that the absolute difference is not less than the region determination threshold, from each of the first image block and the second image block, and wherein deriving the motion vector includes obtaining recursively the motion vector using a pixel value of the third pixel region of each of the first image block and the second image block.

6. The method according to claim 5, wherein generating the interpolation image includes determining an interpolation pixel value using the pixel value of the first pixel region, and copying the interpolation pixel value to the to-be-interpolated block to generate the interpolation image.

7. The method according to claim 5, wherein determining the region determination threshold includes generating a third image block including a plurality of pixels each having the absolute difference as a pixel value, computing an evaluation function by (average sum of absolute differences between high correlation pixels)/(the number of high correlation pixels) on the high correlation pixels each having a pixel value smaller than a candidate threshold of the third image block, and determining one of a plurality of candidate thresholds that gives a minimum evaluation function as the region determination threshold.

8. The method according to claim 5, wherein generating the interpolation pixel value includes generating an average pixel value of paired opposite pixels of the first regions of the first image block and the second image block as the interpolation pixel value.

9. An image interpolating apparatus to interpose an interpolation image between a first reference image and a second reference image adjacent to the first reference image in terms of time, the apparatus comprising:
a search unit configured to search a motion vector from different pairs of blocks on the first reference image and the second reference image symmetrically;
a threshold determination unit configured to determine a region determination threshold using an absolute difference between paired opposite pixels of a first image block of the first reference image and a second image block of the second reference image, the first image block and the second image block being located by the motion vector;
a motion compensation unit configured to motion-compensate, by using the motion vector, a pixel value of a first pixel region of the interpolation image phase that the absolute difference is smaller than the region determination threshold, to obtain a pixel value of a second pixel region corresponding to the first pixel region on the to-be-interpolated block and generate the interpolation image.

10. The apparatus according to claim 9, which comprises an interpolation image generator to generate the interpolation image by determining an interpolation pixel value using the pixel value of the first pixel region, and copying the interpolation pixel value to the to-be-interpolated block.

11. The apparatus according to claim 9, wherein the threshold determination unit includes means for generating a third image block including a plurality of pixels each having the absolute difference as a pixel value, means for computing an evaluation function by (average sum of absolute differences between high correlation pixels)/(the number of high correlation pixels) on the high correlation pixels each having a pixel value smaller than a candidate threshold, for each of a plurality of candidate thresholds, and means for determining one of the candidate thresholds that gives a minimum evaluation function as the region determination threshold.

12. The apparatus according to claim 9, wherein the motion compensation unit comprises an interpolation image generator to generate the interpolation image by copying the pixel value of the second pixel region corresponding to the first pixel region in the to-be-interpolated block to the to-be-interpolated block.

13. The apparatus according to claim 9, wherein the search unit includes means for obtaining recursively the motion vector using the pixel value of the second pixel region of each of the first image block and the second image block.

14. The apparatus according to claim 9, which includes a display unit configured to display the interpolation image, the first reference image and the second reference image as an image.

15. An image interpolation apparatus of interposing an interpolation image between a first reference image and a second reference image adjacent in terms of time, the apparatus comprising:

means for searching a motion vector from different pairs of blocks on the first reference image and the second reference image symmetrically;

means for extracting a first image block and a second image block from the first reference image and the second reference image, respectively, the first image block and the second image block being located by the motion vector;

means for determining a region determination threshold using an absolute difference between paired opposite pixels of the first image block and the second image block;

means for extracting from each of the first image block and the second image block a first pixel region that the absolute difference is smaller than the region determination threshold; and means for generating the interpolation image based on a pixel value of a second pixel region of the to-be-interpolated block that is obtained from a pixel value of the first pixel region of each of the first image block and the second image block, the second pixel region corresponding to the first pixel region.

16. The apparatus according to claim 15, wherein the means for generating the interpolation image includes means for determining an interpolation pixel value using the pixel value of the first pixel region, and means for copying the interpolation pixel value to the to-be-interpolated block to generate the interpolation image.

17. The apparatus according to claim 16, wherein the means for determining the interpolation pixel value includes means for generating an average pixel value of paired opposite pixels of the first regions of the first image block and the second image block as the interpolation pixel value.

18. The apparatus according to claim 15, wherein the means for determining the region determination threshold includes means for generating a third image block including a plurality of pixels each having the absolute difference as a pixel value, means for computing an evaluation function by (average sum of absolute differences between high correlation pixels)/(the number of high correlation pixels) on the high correlation pixels each having a pixel value smaller than a candidate threshold, for each of a plurality of candidate thresholds, and means for determining one of the candidate thresholds that gives a minimum evaluation function as the region determination threshold.

19. The apparatus according to claim 15, which further includes means for extracting a third pixel region that the absolute difference is not less than the region determination threshold, from each of the first image block and the second image block, and wherein the means for deriving the motion vector includes means for obtaining recursively the motion vector using a pixel value of the third pixel region of each of the first image block and the second image block.

20. The apparatus according to claim 19, wherein the means for generating the interpolation image includes means for determining an interpolation pixel value using the pixel value of the first pixel region, and means for copying the interpolation pixel value to the to-be-interpolated block to generate the interpolation image.

21. The apparatus according to claim 20, wherein the means for determining the region determination threshold includes means for generating a third image block including a plurality of pixels each having the absolute difference as a pixel value, means for computing an evaluation function by (average sum of absolute differences between high correlation pixels)/(the number of high correlation pixels) on the high correlation pixels each having a pixel value smaller than a candidate threshold, for each of a plurality of candidate thresholds, and means for determining one of the candidate thresholds that gives a minimum evaluation function as the region determination threshold.

22. The apparatus according to claim 21, wherein the means for generating the interpolation pixel value includes means for generating an average pixel value of paired opposite pixels of the first regions of the first image block and the second image block as the interpolation pixel value.

\* \* \* \* \*